United States Patent
Yunusov et al.

(10) Patent No.: US 11,563,614 B2
(45) Date of Patent: Jan. 24, 2023

(54) SPECTRAL EFFICIENCY FOR TONE RESERVATION PEAK-TO-AVERAGE POWER RATIO REDUCTION

(71) Applicant: QUALCOMM Incorporated, San Diego, CA (US)

(72) Inventors: David Yunusov, Holon (IL); Shay Landis, Hod Hasharon (IL); Ory Eger, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/190,144

(22) Filed: Mar. 2, 2021

(65) Prior Publication Data

US 2021/0281456 A1    Sep. 9, 2021

Related U.S. Application Data

(60) Provisional application No. 62/984,749, filed on Mar. 3, 2020.

(51) Int. Cl.
*H04L 27/26* (2006.01)

(52) U.S. Cl.
CPC ...... *H04L 27/2618* (2013.01); *H04L 27/2615* (2013.01); *H04L 27/2637* (2013.01)

(58) Field of Classification Search
CPC ............. H04L 27/2618; H04L 27/2615; H04L 27/2637; H04L 27/2634; H04L 27/30
See application file for complete search history.

(56) References Cited

U.S. PATENT DOCUMENTS

| | | | | |
|---|---|---|---|---|
| 10,756,790 | B2 * | 8/2020 | Shattil | H04L 27/2602 |
| 11,115,160 | B2 * | 9/2021 | Shattil | H04J 15/00 |
| 2018/0309481 | A1 * | 10/2018 | Wu | H04B 7/028 |
| 2020/0220764 | A1 * | 7/2020 | Lim | H04L 27/36 |

(Continued)

FOREIGN PATENT DOCUMENTS

WO    WO-2020242898 A1 * 12/2020    ............ H04J 15/00

OTHER PUBLICATIONS

Kim: PAPR Reduction in OFDM-IM Using Multilevel Dither Signals; IEEE Communications Letters vol. 23, No. 2, Feb. 2019.*

(Continued)

*Primary Examiner* — Jay P Patel
(74) *Attorney, Agent, or Firm* — Holland & Hart LLP

(57) ABSTRACT

Methods, systems, and devices for wireless communications are described. In one example, a transmitting device may identify first and second portions of data to include in a data transmission. The transmitting device may encode the second portion by a configuration of a first subset of resource elements. The transmitting device may transmit, via the data transmission, first signals representative of the first portion over the first subset and one or more second signals over a second subset of resource elements. A receiving device may receive the data transmission and may identify that the one or more second signals include content other than data of the data transmission. The receiving device may decode the first signals in order to identify the first portion and the configuration in order to identify the second portion. The receiving device may refrain from decoding the one or more second signals based on the identifying.

28 Claims, 13 Drawing Sheets

(56) References Cited

U.S. PATENT DOCUMENTS

| | | | | |
|---|---|---|---|---|
| 2020/0374054 A1* | 11/2020 | Shattil | ............ | H04L 5/0005 |
| 2020/0396038 A1* | 12/2020 | Qaraqe | ............ | H04W 16/14 |
| 2021/0044464 A1* | 2/2021 | Chen | ............ | H04L 5/001 |
| 2021/0399849 A1* | 12/2021 | Shattil | ............ | H04L 5/0005 |

OTHER PUBLICATIONS

Aboharba I., et al., "Performance Analysis of a Low-Complexity Detection for OFDM Index Modulation over Nakagami-m Fading", 2017 IEEE 30TH Canadian Conference on Electrical and Computer Engineering (CCECE), IEEE, Apr. 30, 2017 (Apr. 30, 2017), 4 pages, XP033105402, DOI: 10.1109/CCECE.2017.7946745 [retrieved on Jun. 12, 2017] figure 1 Section II.

International Search Report and Written Opinion—PCT/US2021/020667—ISA/EPO—dated Jun. 4, 2021.

Memisoglu E., et al., "Low Complexity Peak-to-Average Power Ratio Reduction in OFDM-IM," 2018 IEEE International Black Sea Conference on Communications and Networking (BLACKSEACOM), IEEE, Jun. 4, 2018 (Jun. 4, 2018), 5 pages, XP033383445, DOI: 10.1109/BLACKSEACOM.2018.8433654 [retrieved on Aug. 10, 2018] figure 2, Sections II, and III.

Zheng J., et al., "Peak-to-Average Power Ratio Reduction in OFDM Index Modulation Through Convex Programming", IEEE Communications Letters, IEEE Service Center, Piscataway, NJ, US, vol. 21, No. 7, Jul. 1, 2017 (Jul. 1, 2017), pp. 1505-1508, XP011656000, ISSN: 1089-7798, DOI: 10.1109/LCOMM.2017.2690418 [retrieved on Jul. 10, 2017] figure 1 Sections II and III.

\* cited by examiner

SPECTRAL EFFICIENCY FOR TONE RESERVATION PEAK-TO-AVERAGE POWER RATIO REDUCTION

CROSS REFERENCE

The present Application for Patent claims the benefit of U.S. Provisional Patent Application No. 62/984,749 by YUNUSOV et al., entitled "SPECTRAL EFFICIENCY FOR TONE RESERVATION PAPR REDUCTION," filed Mar. 3, 2020, assigned to the assignee hereof, and expressly incorporated by reference herein.

FIELD OF TECHNOLOGY

The following relates generally to wireless communications and more specifically to improved spectral efficiency for tone reservation peak-to-average power ratio (PAPR) reduction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a transmitting device may include a power amplifier (PA) to amplify signals before transmission. As a peak-to-average power ratio (PAPR) increases, the PA may produce increasingly distorted signals. To limit signal distortion, the input power of the signal may be limited to be below or near a back-off (BO) value. Such limitations may limit the capability of the transmitting device to perform wireless communications.

SUMMARY

The described techniques relate to improved methods, systems, devices, and apparatuses that support improved spectral efficiency for tone reservation peak-to-average power ratio (PAPR) reduction. Generally, the described techniques provide for a transmitting device to reduce PAPR while increasing an amount of data that may be conveyed to a receiving device. For instance, a transmitting device (e.g., a user equipment (UE) or base station) may identify data to include in an index modulation orthogonal frequency division multiplexing (IM-OFDM) data transmission for which a set of resource elements is available, where the data may include a first portion and a second portion and the set of resource elements may include a first subset of resource elements and a second subset of resource elements. The transmitting device may include the first portion of the data in the first subset of resource elements, where the first subset of resource elements is selected to correspond to one or more active subcarriers for the IM-OFDM data transmission. The transmitting device may encode the second portion of the data by a configuration of the first subset of resource elements. The transmitting device may transmit, via the IM-OFDM data transmission, first signals over the first subset of resource elements, the first signals representative of the first portion of the data. The transmitting device may transmit, via the IM-OFDM data transmission and over one or more resource elements of the second subset of resource elements, one or more second signals.

Additionally or alternatively, a receiving device (e.g., a UE or base station) may receive, via an IM-OFDM data transmission over a set of resource elements, first signals over a first subset of resource elements of the set of resource elements, and one or more second signals over a second subset of resource elements of the set of resource elements. The receiving device may identify that the one or more second signals include content other than data of the IM-OFDM data transmission. The receiving device may decode the first signals over the first subset of resource elements in order to identify a first portion of the data of the IM-OFDM data transmission. The receiving device may decode a configuration of the first subset of resource elements in order to identify a second portion of the data of the IM-OFDM data transmission. The receiving device may refrain from decoding the one or more second signals based on the identifying.

A method for wireless communication is described. The method may include identifying data to include in an IM-OFDM data transmission for which a set of resource elements is available, where the data includes a first portion and a second portion and the set of resource elements includes a first subset of resource elements and a second subset of resource elements, including the first portion of the data in the first subset of resource elements, where the first subset of resource elements are selected to correspond to one or more active subcarriers for the IM-OFDM data transmission, encoding the second portion of the data by a configuration of the first subset of resource elements, transmitting, via the IM-OFDM data transmission, first signals over the first subset of resource elements, the first signals representative of the first portion of the data, and transmitting, via the IM-OFDM data transmission and over one or more resource elements of the second subset of resource elements, one or more second signals.

An apparatus for wireless communication is described. The apparatus may include a processor, memory coupled with the processor, and instructions stored in the memory. The instructions may be executable by the processor to cause the apparatus to identify data to include in an IM-OFDM data transmission for which a set of resource elements is available, where the data includes a first portion and a second portion and the set of resource elements includes a first subset of resource elements and a second subset of resource elements, include the first portion of the data in the first subset of resource elements, where the first subset of resource elements are selected to correspond to one or more active subcarriers for the IM-OFDM data transmission, encode the second portion of the data by a configuration of the first subset of resource elements, transmit, via the IM-OFDM data transmission, first signals over the first subset of resource elements, the first signals representative of the first portion of the data, and transmit, via the IM-OFDM data transmission and over one or more resource elements of the second subset of resource elements, one or more second signals.

Another apparatus for wireless communication is described. The apparatus may include means for identifying data to include in an IM-OFDM data transmission for which a set of resource elements is available, where the data includes a first portion and a second portion and the set of resource elements includes a first subset of resource elements and a second subset of resource elements, means for including the first portion of the data in the first subset of resource elements, where the first subset of resource elements are selected to correspond to one or more active subcarriers for the IM-OFDM data transmission, means for encoding the second portion of the data by a configuration of the first subset of resource elements, means for transmitting, via the IM-OFDM data transmission, first signals over the first subset of resource elements, the first signals representative of the first portion of the data, and means for transmitting, via the IM-OFDM data transmission and over one or more resource elements of the second subset of resource elements, one or more second signals.

A non-transitory computer-readable medium storing code for wireless communication is described. The code may include instructions executable by a processor to identify data to include in an IM-OFDM data transmission for which a set of resource elements is available, where the data includes a first portion and a second portion and the set of resource elements includes a first subset of resource elements and a second subset of resource elements, include the first portion of the data in the first subset of resource elements, where the first subset of resource elements are selected to correspond to one or more active subcarriers for the IM-OFDM data transmission, encode the second portion of the data by a configuration of the first subset of resource elements, transmit, via the IM-OFDM data transmission, first signals over the first subset of resource elements, the first signals representative of the first portion of the data, and transmit, via the IM-OFDM data transmission and over one or more resource elements of the second subset of resource elements, one or more second signals.

Some examples of the method, apparatuses, and non-transitory computer-readable medium described herein may further include operations, features, means, or instructions for reducing a peak-to-average-power ratio associated with transmission of the first signals by transmission of the one or more second signals.

In some examples of the method, apparatuses, and non-transitory computer-readable medium described herein, the one or more second signals may be tone reservation or dummy signals.

Some examples of the method, apparatuses, and non-transitory computer-readable medium described herein may further include operations, features, means, or instructions for selecting the configuration according to an index modulation scheme.

Some examples of the method, apparatuses, and non-transitory computer-readable medium described herein may further include operations, features, means, or instructions for transmitting control signaling indicating a frequency band including the set of resource elements.

In some examples of the method, apparatuses, and non-transitory computer-readable medium described herein, a transmit power associated with each first signal transmitted over the one or more resource elements of the first subset may be greater than a transmit power associated with each second signal transmitted over the one or more resource elements of the second subset.

In some examples of the method, apparatuses, and non-transitory computer-readable medium described herein, the second signal over each of the second subset of resource elements may be configured to reduce a peak-to-average-power ratio associated with transmission of the first signals based on reducing one or more peaks associated with the first signals.

In some examples of the method, apparatuses, and non-transitory computer-readable medium described herein, the first portion of the data corresponds to a set of bits, and where the first signals transmitted over the one or more resource elements of the first subset cumulatively indicate each bit of the set of bits.

In some examples of the method, apparatuses, and non-transitory computer-readable medium described herein, the first portion of the data corresponds to a set of bits, and where each first signal transmitted over the one or more resource elements of the first subset indicates a same number of bits of the set of bits.

In some examples of the method, apparatuses, and non-transitory computer-readable medium described herein, a total number of resource elements of the first subset of resource elements may be based on a total number of resource elements of the set of resource elements and a total number of bits corresponding to the second portion of the data.

In some examples of the method, apparatuses, and non-transitory computer-readable medium described herein, a total number of bits corresponding to the second portion of the data may be based on a total number of resource elements of the first subset of resource elements and a total number of resource elements of the set of resource elements.

A method for wireless communication is described. The method may include receiving, via an IM-OFDM data transmission over a set of resource elements, first signals over a first subset of resource elements of the set of resource elements, and one or more second signals over a second subset of resource elements of the set of resource elements, identifying that the one or more second signals include content other than data of the IM-OFDM data transmission, decoding the first signals over the first subset of resource elements in order to identify a first portion of the data of the IM-OFDM data transmission, decoding a configuration of the first subset of resource elements in order to identify a second portion of the data of the IM-OFDM data transmission, and refraining from decoding the one or more second signals based on the identifying.

An apparatus for wireless communication is described. The apparatus may include a processor, memory coupled with the processor, and instructions stored in the memory. The instructions may be executable by the processor to cause the apparatus to receive, via an IM-OFDM data transmission over a set of resource elements, first signals over a first subset of resource elements of the set of resource elements, and one or more second signals over a second subset of resource elements of the set of resource elements, identify that the one or more second signals include content other than data of the IM-OFDM data transmission, decode the first signals over the first subset of resource elements in order to identify a first portion of the data of the IM-OFDM data transmission, decode a configuration of the first subset of resource elements in order to identify a second portion of the data of the IM-OFDM data transmission, and refrain from decoding the one or more second signals based on the identifying.

Another apparatus for wireless communication is described. The apparatus may include means for receiving, via an IM-OFDM data transmission over a set of resource elements, first signals over a first subset of resource elements of the set of resource elements, and one or more second signals over a second subset of resource elements of the set of resource elements, means for identifying that the one or more second signals include content other than data of the IM-OFDM data transmission, means for decoding the first signals over the first subset of resource elements in order to identify a first portion of the data of the IM-OFDM data transmission, means for decoding a configuration of the first subset of resource elements in order to identify a second portion of the data of the IM-OFDM data transmission, and means for refraining from decoding the one or more second signals based on the identifying.

A non-transitory computer-readable medium storing code for wireless communication is described. The code may include instructions executable by a processor to receive, via an IM-OFDM data transmission over a set of resource elements, first signals over a first subset of resource elements of the set of resource elements, and one or more second signals over a second subset of resource elements of the set of resource elements, identify that the one or more second signals include content other than data of the IM-OFDM data transmission, decode the first signals over the first subset of resource elements in order to identify a first portion of the data of the IM-OFDM data transmission, decode a configuration of the first subset of resource elements in order to identify a second portion of the data of the IM-OFDM data transmission, and refrain from decoding the one or more second signals based on the identifying.

In some examples of the method, apparatuses, and non-transitory computer-readable medium described herein, the one or more second signals may be tone reservation or dummy signals.

Some examples of the method, apparatuses, and non-transitory computer-readable medium described herein may further include operations, features, means, or instructions for decoding the configuration according to an index modulation scheme.

Some examples of the method, apparatuses, and non-transitory computer-readable medium described herein may further include operations, features, means, or instructions for receiving control signaling indicating a frequency band including the set of resource elements, where identifying that the one or more second signals include the content other than the data of the IM-OFDM data transmission may be based on receiving the control signaling.

Some examples of the method, apparatuses, and non-transitory computer-readable medium described herein may further include operations, features, means, or instructions for identifying that the one or more second signals include the content other than the data of the IM-OFDM data transmission may be based on a receive power associated with the first signals being greater than a receive power associated with the one or more second signals.

In some examples of the method, apparatuses, and non-transitory computer-readable medium described herein, the first portion of the data includes a set of bits, and where the first signals cumulatively indicate each bit of the set of bits.

In some examples of the method, apparatuses, and non-transitory computer-readable medium described herein, the first portion of the data includes a set of bits, and where each of the first signals indicate a same number of bits.

Some examples of the method, apparatuses, and non-transitory computer-readable medium described herein may further include operations, features, means, or instructions for determining a total number of resource elements of the second subset of resource elements based on a total number of resource elements of the set of resource elements and a total number of bits corresponding to the second portion of the data.

Some examples of the method, apparatuses, and non-transitory computer-readable medium described herein may further include operations, features, means, or instructions for determining a total number of bits corresponding to the second portion of the data based on a total number of resource elements of the second subset of resource elements and a total number of resource elements of the set of resource elements.

A method for wireless communication is described. The method may include identifying data for an IM-OFDM transmission, identifying, from a set of allocated resources, first subcarriers for transmitting a first signal comprising the data, and identifying, from the set of allocated resources, second subcarriers comprising a tone reservation for the IM-OFDM transmission on which the data is not transmitted. The method may also include processing a second signal for transmission on the second subcarriers, the second signal comprising a peak-cancellation signal determined based at least in part on a waveform of the first signal. The method may also include transmitting, in the IM-OFDM transmission, the first signal on the first subcarriers of the resource allocation, and transmitting, in the IM-OFDM transmission, the second signal on the second subcarriers of the resource allocation.

An apparatus for wireless communication is described. The apparatus may include a processor, memory coupled with the processor, and instructions stored in the memory. The instructions may be executable by the processor to cause the apparatus to identify data for an IM-OFDM transmission, to identify, from a set of allocated resources, first subcarriers for transmitting a first signal comprising the data, and to identify, from the set of allocated resources, second subcarriers comprising a tone reservation for the IM-OFDM transmission on which the data is not transmitted. The instructions may be executable by the processor to cause the apparatus to process a second signal for transmission on the second subcarriers, the second signal comprising a peak-cancellation signal determined based at least in part on a waveform of the first signal. The instructions may be executable by the processor to cause the apparatus to transmit, in the IM-OFDM transmission, the first signal on the first subcarriers of the resource allocation, and to transmit, in the IM-OFDM transmission, the second signal on the second subcarriers of the resource allocation.

Another apparatus for wireless communication is described. The apparatus may include means for identifying data for an IM-OFDM transmission, means for identifying, from a set of allocated resources, first subcarriers for transmitting a first signal comprising the data, and means for identifying, from the set of allocated resources, second subcarriers comprising a tone reservation for the IM-OFDM transmission on which the data is not transmitted. The apparatus may include means for processing a second signal for transmission on the second subcarriers, the second signal comprising a peak-cancellation signal determined based at least in part on a waveform of the first signal. The apparatus may also include means for transmitting, in the IM-OFDM transmission, the first signal on the first subcarriers of the resource allocation, and means for transmitting, in the IM-OFDM transmission, the second signal on the second subcarriers of the resource allocation.

A non-transitory computer-readable medium storing code for wireless communication is described. The code may include instructions executable by a processor to identify data for an IM-OFDM transmission, to identify, from a set of allocated resources, first subcarriers for transmitting a first signal comprising the data, and to identify, from the set of allocated resources, second subcarriers comprising a tone reservation for the IM-OFDM transmission on which the data is not transmitted. The code may include instructions executable by the processor to process a second signal for transmission on the second subcarriers, the second signal comprising a peak-cancellation signal determined based at least in part on a waveform of the first signal. The code may also include instructions executable by the processor to transmit, in the IM-OFDM transmission, the first signal on the first subcarriers of the resource allocation, and to transmit, in the IM-OFDM transmission, the second signal on the second subcarriers of the resource allocation.

A method for wireless communication is described. The method may include receiving an IM-OFDM transmission, wherein the IM-OFDM transmission comprises a first signal comprising data on first subcarriers of a set of allocated resources and a second signal comprising a peak-cancellation signal on second subcarriers of the set of allocated resources. The method may also include identifying that the second subcarriers comprise a tone reservation for the IM-OFDM transmission on which data is not transmitted, and determining a waveform of the first signal based at least in part on the identifying. The method may also include decoding the first signal in order to identify the data based at least in part on the determining. and refraining from decoding the second signal based at least in part on the identifying.

An apparatus for wireless communication is described. The apparatus may include a processor, memory coupled with the processor, and instructions stored in the memory. The instructions may be executable by the processor to cause the apparatus to receive an IM-OFDM transmission, wherein the IM-OFDM transmission comprises a first signal comprising data on first subcarriers of a set of allocated resources and a second signal comprising a peak-cancellation signal on second subcarriers of the set of allocated resources. The instructions may be executable by the processor to cause the apparatus to identify that the second subcarriers comprise a tone reservation for the IM-OFDM transmission on which data is not transmitted, and to determine a waveform of the first signal based at least in part on the identifying. The instructions may be executable by the processor to cause the apparatus to decode the first signal in order to identify the data based at least in part on the determining, and to refrain from decoding the second signal based at least in part on the identifying.

Another apparatus for wireless communication is described. The apparatus may include means for receiving an IM-OFDM transmission, wherein the IM-OFDM transmission comprises a first signal comprising data on first subcarriers of a set of allocated resources and a second signal comprising a peak-cancellation signal on second subcarriers of the set of allocated resources. The apparatus may include means for identifying that the second subcarriers comprise a tone reservation for the IM-OFDM transmission on which data is not transmitted, and means for determining a waveform of the first signal based at least in part on the identifying. The apparatus may also include means for decoding the first signal in order to identify the data based at least in part on the determining, and means for refraining from decoding the second signal based at least in part on the identifying.

A non-transitory computer-readable medium storing code for wireless communication is described. The code may include instructions executable by a processor to receive an IM-OFDM transmission, wherein the IM-OFDM transmission comprises a first signal comprising data on first subcarriers of a set of allocated resources and a second signal comprising a peak-cancellation signal on second subcarriers of the set of allocated resources. The code may include instructions executable by the processor to identify that the second subcarriers comprise a tone reservation for the IM-OFDM transmission on which data is not transmitted, and to determine a waveform of the first signal based at least in part on the identifying. The code may include instructions executable by the processor to decode the first signal in order to identify the data based at least in part on the determining, and to refrain from decoding the second signal based at least in part on the identifying.

DETAILED DESCRIPTION

In some cases, a transmitting device (e.g., a user equipment (UE) or base station) may transmit information to a receiving device using index modulation (IM) (e.g., index modulation orthogonal frequency division multiplexing (IM-OFDM) data transmissions). Performing IM may involve the transmitting device selecting a set of resource elements (REs) over which to transmit a first portion of the information (i.e., active REs), where a configuration or pattern of the active REs indicates a second portion of the information. The transmitting device may not transmit information over non-active REs (e.g., the non-active REs may be empty REs).

In some cases, the signals transmitted over each of the active REs may combine to create a signal with one or more associated peaks. A ratio of a peak power of the combined signal to an average power of the combined signal may be referred to as a peak-to-average power ratio (PAPR). As the PAPR increases, a power amplifier (PA) used to amplify the combined signal may produce non-linearities in the signal, such as spectral growth, which may affect an error vector magnitude (EVM) associated with the signal.

In the present disclosure, one or more signals may be transmitted in each of the non-active REs that are configured to lower the PAPR associated with the signals transmitted over the active REs. Non-active REs containing such signals may be referred to as tone reservation REs. The one or more signals transmitted over the tone reservation REs may be configured to cancel out or reduce an amplitude of the one or more peaks of the combined active RE signal. By reducing the one or more peaks, the PA may produce fewer or less significant non-linearities.

Aspects of the disclosure are initially described in the context of wireless communications systems. Additional aspects of the disclosure are described in the context of an additional wireless communications system, IM scheme, and a process flow. Aspects of the disclosure are further illustrated by and described with reference to apparatus diagrams, system diagrams, and flowcharts that relate to improved spectral efficiency for tone reservation PAPR reduction.

Figure 1:
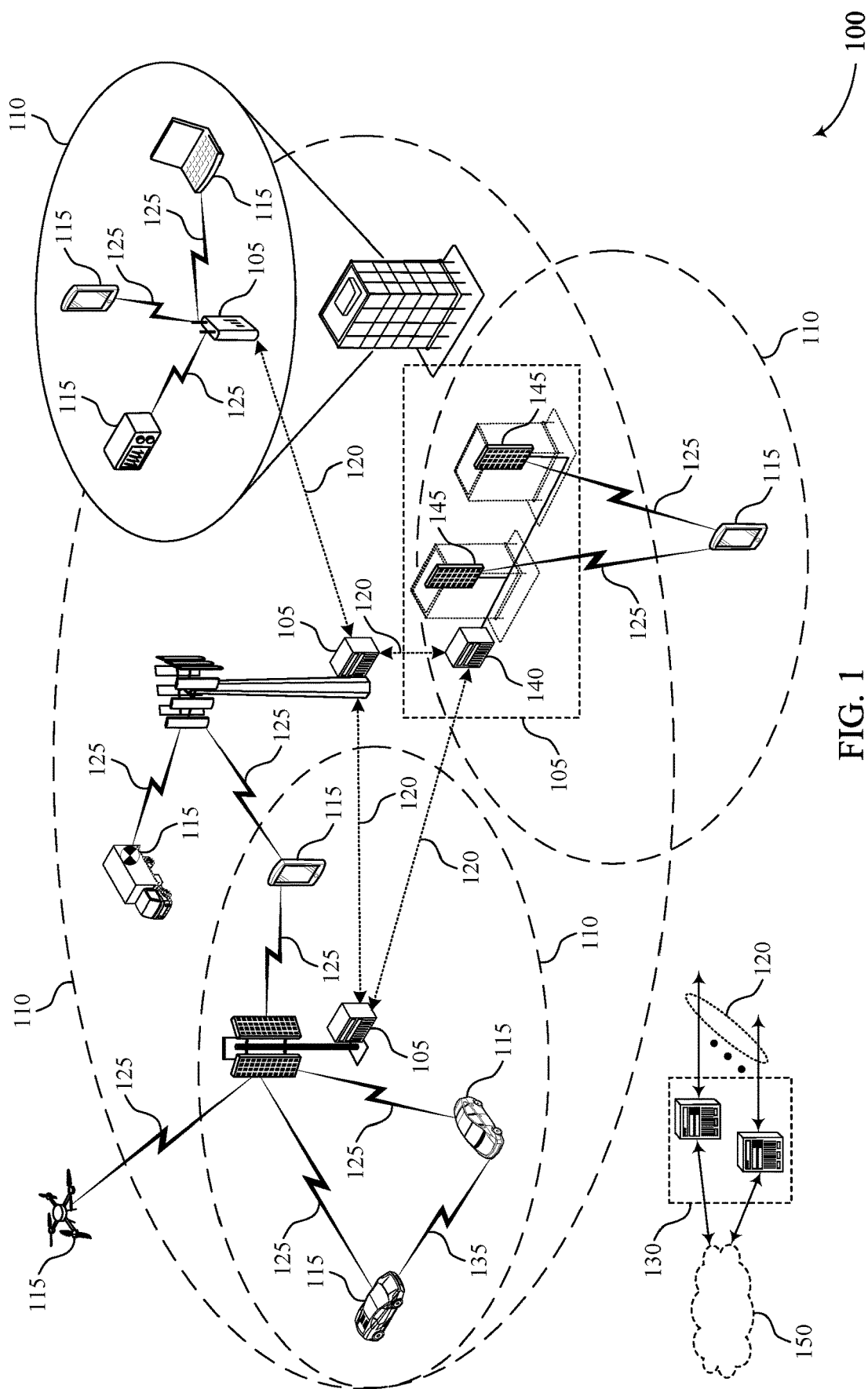
FIG. 1 illustrates an example of a wireless communications system that supports improved spectral efficiency for tone reservation peak-to-average power ratio (PAPR) reduction in accordance with aspects of the present disclosure.

FIG. 1 illustrates an example of a wireless communications system 100 that supports improved spectral efficiency for tone reservation PAPR reduction in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of TS=1/($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a transmitting device (e.g., a UE 115 or base station 105) may have a PA. PAs may suffer from non-linearities as they approach their saturation point. Amplifying signals near saturation point may achieve maximum power efficiency, but may also saturate or clip the transmitted signal. Such saturating or clipping may distort the transmitted signal, which may thus generate output non-linearities such as spectral growth. Spectral growth may refer to the PA introducing frequencies into the signal that were not present before or were present in smaller proportions. Additionally, distorting the signal may have an impact on transmitted EVM such that the impact exceeds a constraint. As the PAPR of a signal increases, a larger back-off (BO) may be taken such that the impact on the EVM does not exceed the constraint for constellations of a threshold size.

Generally, the described techniques provide for a transmitting device to reduce PAPR while increasing an amount of data that may be conveyed to a receiving device. For instance, a transmitting device (e.g., a UE 115 or base station 105) may identify data to include in an IM-OFDM data transmission for which a set of REs is available, where the data may include a first portion and a second portion and the set of REs may include a first subset of REs and a second subset of REs. The transmitting device may include the first portion of the data in the first subset of REs, where the first subset of REs is selected to correspond to one or more active subcarriers for the IM-OFDM data transmission. The transmitting device may encode the second portion of the data by a configuration of the first subset of REs. The transmitting device may transmit, via the IM-OFDM data transmission, first signals over the first subset of REs, the first signals representative of the first portion of the data. The transmitting device may transmit, via the IM-OFDM data transmission and over one or more REs of the second subset of REs, one or more second signals.

Additionally or alternatively, a receiving device (e.g., a UE 115 or base station 105) may receive, via an IM-OFDM data transmission over a set of REs, first signals over a first subset of REs of the set of REs, and one or more second signals over a second subset of REs of the set of REs. The receiving device may identify that the one or more second signals include content other than data of the IM-OFDM data transmission. The receiving device may decode the first signals over the first subset of REs in order to identify a first portion of the data of the IM-OFDM data transmission. The receiving device may decode a configuration of the first subset of REs in order to identify a second portion of the data of the IM-OFDM data transmission. The receiving device may refrain from decoding the one or more second signals based on the identifying.

Figure 2:
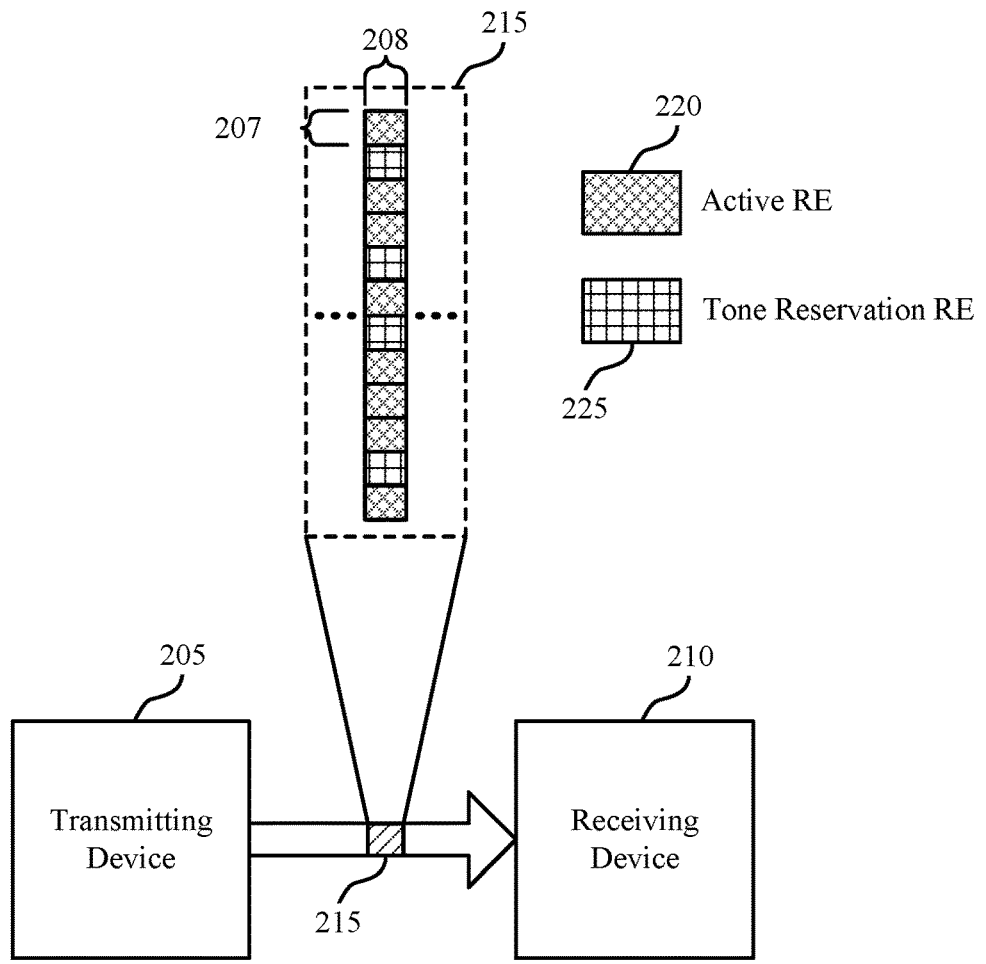
FIG. 2 illustrates an example of a wireless communications system that supports improved spectral efficiency for tone reservation PAPR reduction in accordance with aspects of the present disclosure.

FIG. 2 illustrates an example of a wireless communications system 200 that supports improved spectral efficiency for tone reservation PAPR reduction in accordance with aspects of the present disclosure. In some examples, wireless communications system 200 may implement aspects of wireless communications system 100. Transmitting device 205 and receiving device 210 may each be example of a UE 115 or a base station 105 as described with reference to FIG. 1.

In some cases, transmitting device 205 may transmit transmission 215 to receiving device 210. Transmission 215 may span a set of REs. Each RE may span a set of frequencies (e.g., a subcarrier 207) and a duration of time (e.g., time duration 208).

The transmission 215 may convey information (e.g., data) to receiving device 210 using OFDM-IM. When using OFDM-IM, a first portion of the information (e.g., one or more data bits) may be explicitly signaled over active REs 220. For instance, each signal transmitted over a respective active RE 220 may convey X bits of information, where there are K active REs (e.g., 8, in the present example). As such, the total number of information bits in the first portion of the information may be NX information bits. Additionally, when using OFDM-IM, the configuration or pattern of REs may convey a second portion of the information (e.g., one or more data bits). If there are K active REs (e.g., 8, in the present example) and N total allocated REs (12, in the present example), the total number of information bits in the second portion of the information may be equal to floor($\log_2$(N!/(K!*(N−K)!))), where floor(Y) may be an operation that rounds Y down to a closest lower integer value. Generally, OFDM-IM my increase spectral efficiency by conveying information through REs or subcarriers chosen to be active.

In one example, the REs that are not active REs 220 (e.g., non-activated subcarriers) may be empty REs. The empty REs may not include signaling from the transmitting device 205 and may not carry information in conventional schemes. However, as described herein, OFDM signals may be associated with higher PAPRs are compared to signals modulated using other schemes. As such, OFDM signals may be more likely to be clipped by a PA. Such clipping may be more detrimental as a size of a constellation increases (e.g., from 4 quadrature amplitude modulation (QAM) to 256 QAM to 1024 QAM and so on). An example of an IM scheme using empty REs may be described with reference to FIG. 3.

In another example, one or more REs that are not active REs 220 may be tone reservation REs 225. Tone reservation REs 225 may include a peak-cancelling signal that lowers the PAPR of transmission 215 in the time domain. Tone reservation REs 225 may not be empty due to including dummy signals. The signals transmitted in the tone reservation REs 225 may carry a signal that minimizes or reduces the PAPR of the signal by lowering the peaks of transmission 215 in the time domain. The relative power in the tone reservation REs 225 may be lower than the power in the active REs 220, which may be referred to as regular data carrier REs. By being lower power, receiving device 210 may be capable of identifying which REs are active REs 220 and which are tone reservation REs 225. Additionally, by being lower power, the tone reservation REs 225 may add less power to transmission 215 than if they had the same or more power than the active REs 220.

Upon receiving the transmission 215, the receiving device 210 may identify the REs that are active REs 220 and may discard the tone reservation REs 225 used for PAPR reduction. In some cases, the configuration or pattern of the tone reservation REs 225 may carry additional information bits. By using the tone reservation REs 225 to lower the PAPR, a lower BO may be used for a working point of a PA of the transmitting device 205. As such, increased PA efficiency may be achieved due to using tone reservation REs 225 and increased spectral efficiency may be achieved due to using OFDM-IM.

Generally, the techniques as described herein may be used to increase spectral efficiency. For instance, the techniques as described herein may increase a capability of transmission 215 to meet EVM constraints. Additionally, the techniques as described herein may be used to increase PA efficiency. For instance, transmitting devices 205 performing the method as described herein may use a lower BO, have a higher PA working point, a higher efficiency, or a combination thereof compared to transmitting devices 205 whose transmissions do not use tone reservation REs 225 (e.g., those that use empty REs, as described with reference to FIG. 3).

Figure 3:
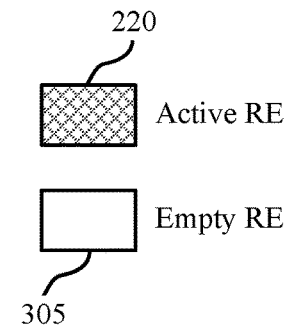
FIG. 3 illustrates an example of an index modulation (IM) scheme that supports improved spectral efficiency for tone reservation PAPR reduction in accordance with aspects of the present disclosure.
Figure 3:
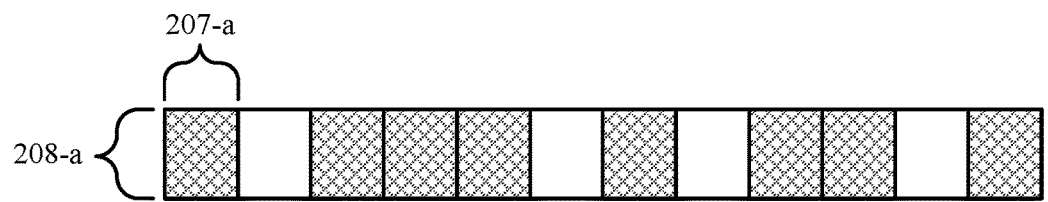

FIG. 3 illustrates an example of an IM scheme 300 that supports improved spectral efficiency for tone reservation PAPR reduction in accordance with aspects of the present disclosure. In some examples, IM scheme 300 may implement aspects of wireless communications system 100. In some cases, IM scheme 300 may represent REs for a transmission modulated using OFDM-IM that does not include tone reservation REs 225.

IM scheme 300 may include active REs 220 and empty REs 305 for a transmission 215. Each RE may span a set of frequencies (e.g., a subcarrier 207-a) and a duration of time (e.g., time duration 208-a). The bitstream corresponding to the information to be transmitted may be split into a subcarrier index selection (e.g., the second portion of the information, as described in FIG. 2) and an M-ary constellation (e.g., the first portion of the information, as described in FIG. 2). Active REs 220 may include one or more signals that convey information bits as described with reference to FIG. 2. The active REs 220 may be modulated according to OFDM. Empty REs 305, meanwhile, may not include signals transmitted by the transmitting device 205. As such, a subset of the available REs may be activated (e.g., active REs 220) and the remaining available REs may be set to 0 (e.g., empty REs 305). Thus, the empty REs 305 may not be used to reduce a PAPR of the transmission 215. Additionally, the empty REs 305 may not carry information, as they may be empty of signaling transmitted from the transmitting device 205.

Figure 4:
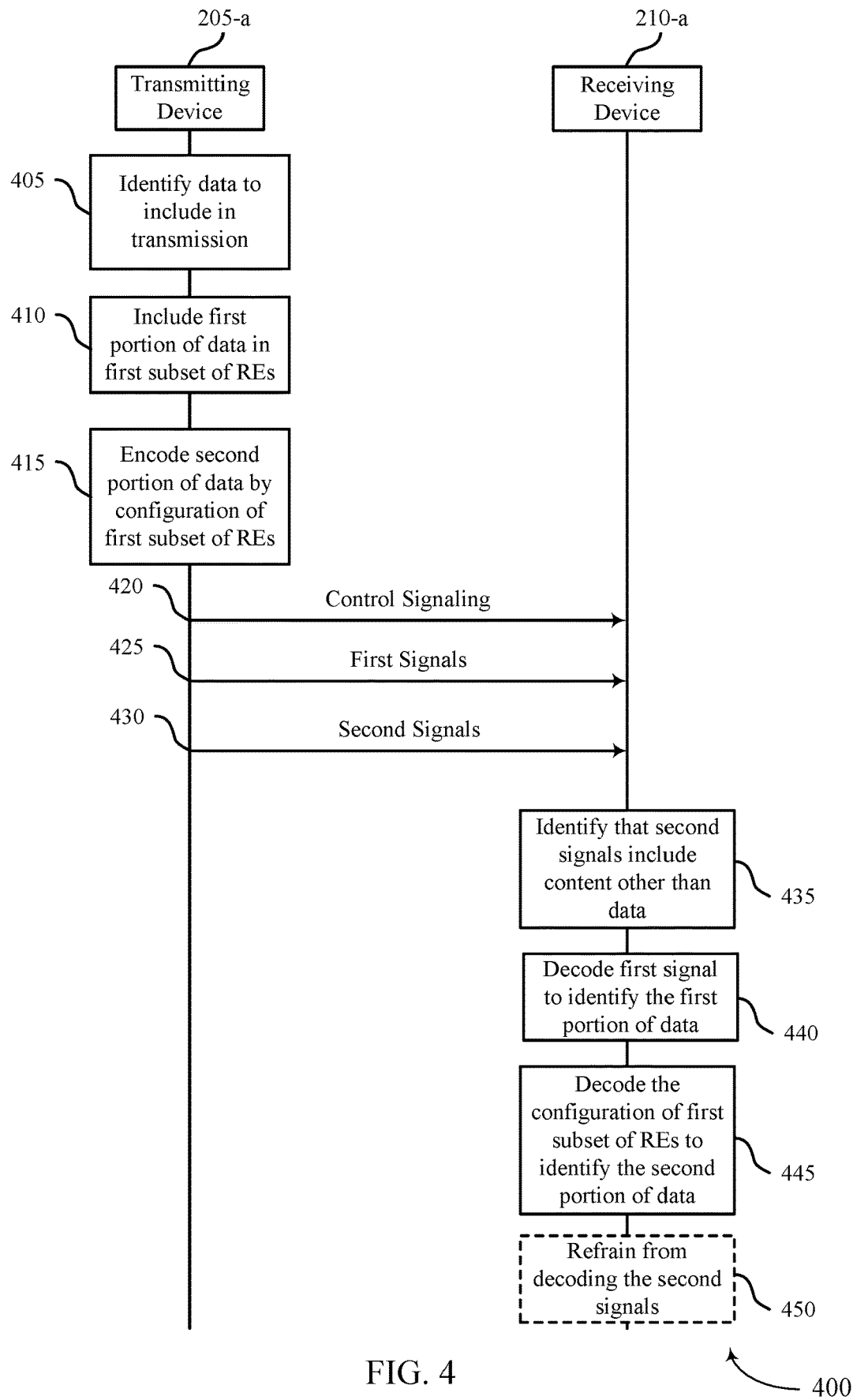
FIG. 4 illustrates an example of a process flow that supports improved spectral efficiency for tone reservation PAPR reduction in accordance with aspects of the present disclosure.

FIG. 4 illustrates an example of a process flow 400 that supports improved spectral efficiency for tone reservation PAPR reduction in accordance with aspects of the present disclosure. In some examples, process flow 400 may implement aspects of wireless communications system 200. For instance, transmitting device 205-a may be an example of a transmitting device as described with reference to FIG. 2 and receiving device 210-a may be an example of a receiving device as described with reference to FIG. 2.

At 405, transmitting device 205-a may identify data to include in an IM-OFDM data transmission for which a set of REs is available. The data may include a first portion and a second portion and the set of REs includes a first subset of REs and a second subset of REs. In some cases, the first portion of the data corresponds to a first set of bits and the second portion of the data corresponds to a second set of bits. In some cases, a total number of REs of the first subset of REs is based on a total number of REs of the set of REs and a total number of bits corresponding to the second portion of the data. In some cases, a total number of bits corresponding to the second portion of the data is based on a total number of REs of the first subset of REs and a total number of REs of the set of REs.

At 410, transmitting device 205-a may include the first portion of the data in the first subset of REs. The first subset of REs may be selected to correspond to one or more active subcarriers or active REs for the IM-OFDM data transmission.

At 415, transmitting device 205-a may encode the second portion of the data by a configuration of the first subset of REs. Additionally or alternatively, transmitting device 205-a may encode the second portion of the data by a configuration of the second subset of REs. In some cases, transmitting device 205-a may select the configuration according to an IM scheme.

At 420, transmitting device 205-a may transmit control signaling indicating a frequency band including the set of REs. Receiving device 210-a may receive the control signaling.

At 425, transmitting device 205-a may transmit, via the IM-OFDM data transmission, first signals over the first subset of REs. The first signals may be representative of the first portion of the data. Receiving device 210-a may receive the first signals. In some cases, the first signals transmitted over the one or more REs of the first subset cumulatively indicate each bit of the first set of bits. In some cases, each first signal transmitted over the one or more REs of the first subset indicates a same number of bits of the first set of bits.

At 430, transmitting device 205-a may transmit, via the IM-OFDM data transmission and over the one or more REs of the second subset of REs, one or more second signals. Receiving device 210-a may receive the one or more second signals. In some cases, transmitting device 205-a may reduce a PAPR associated with transmission of the first signals by transmission of the one or more second signals. In some cases, the one or more second signals may be tone reservation or dummy signals. In some cases, a transmit power associated with each first signal transmitted over the one or more REs of the first subset is greater than a transmit power associated with each second signal transmitted over the one or more REs of the second subset. In some cases, the second signal over each of the second subset of REs may be configured to reduce a PAPR associated with a transmission of the first signals based on reducing one or more peaks associated with the first signals.

In some cases, receiving device 210-a may determine a total number of REs of the second subset of REs based on a total number of REs of the set of REs and a total number of bits corresponding to the second portion of the data. In some cases, receiving device 210-a may determine a total number of bits corresponding to the second portion of the data based on a total number of REs of the second subset of REs and a total number of REs of the set of REs.

At 435, receiving device 210-a may identify that the one or more second signals include content other than data of the IM-OFDM data transmission. In some cases, identifying that the one or more second signals include content other than the data of the IM-OFDM data transmission is based on receiving the control signaling. Additionally or alternatively, identifying that the one or more second signals include content other than the data of the IM-OFDM data transmission is based on a receive power associated with the first signals being greater than a receive power associated with the one or more second signals.

At 440, receiving device 210-a may decode the first signals over the first subset of REs in order to identify the first portion of the data of the IM-OFDM data transmission.

At 445, receiving device 210-a may decode the configuration of the first subset of REs in order to identify the second portion of the data of the IM-OFDM data transmission. Additionally or alternatively, if transmitting device 205-a encodes the second portion of the data by a configuration of the second subset of REs, receiving device 210-a may decode the configuration of the second subset of REs in order to identify the second portion of the data of the IM-OFDM data transmission. In some cases, receiving device 210-a may decode the configuration according to an IM scheme.

At 450, receiving device 210-a may refrain from decoding the one or more second signals based on the identifying (e.g., at 435).

Figure 5:
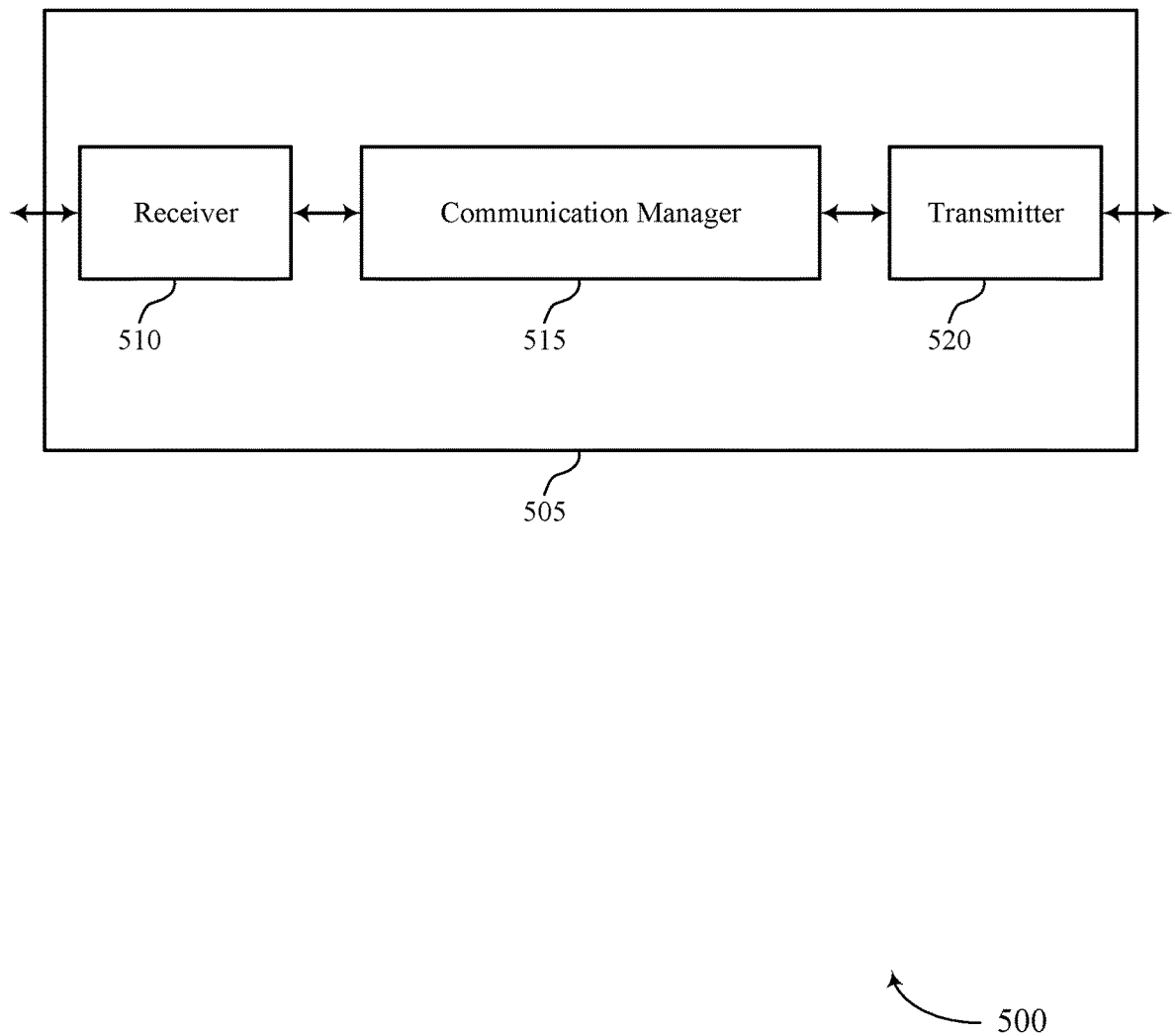
FIGS. 5 and 6 show block diagrams of devices that support improved spectral efficiency for tone reservation PAPR reduction in accordance with aspects of the present disclosure.

FIG. 5 shows a block diagram 500 of a device 505 that supports improved spectral efficiency for tone reservation PAPR reduction in accordance with aspects of the present disclosure. The device 505 may be an example of aspects of a UE 115 or base station 105 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to improved spectral efficiency for tone reservation PAPR reduction, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may identify data to include in an IM-OFDM data transmission for which a set of REs is available, where the data includes a first portion and a second portion and the set of REs includes a first subset of REs and a second subset of REs, include the first portion of the data in the first subset of REs, where the first subset of REs are selected to correspond to one or more active subcarriers for the IM-OFDM data transmission, encode the second portion of the data by a configuration of the first subset of REs, transmit, via the IM-OFDM data transmission, first signals over the first subset of REs, the first signals representative of the first portion of the data, and transmit, via the IM-OFDM data transmission and over one or more REs of the second subset of REs, one or more second signals. The communication manager 515 may also receive, via an IM-OFDM data transmission over a set of REs, first signals over a first subset of REs of the set of REs, and one or more second signals over a second subset of REs of the set of REs, identify that the one or more second signals include content other than data of the IM-OFDM data transmission, decode the first signals over the first subset of REs in order to identify a first portion of the data of the IM-OFDM data transmission, decode a configuration of the first subset of REs in order to identify a second portion of the data of the IM-OFDM data transmission, and refrain from decoding the one or more second signals based on the identifying. The communication manager 515 may be an example of aspects of the communication manager 810 or 9910 as described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
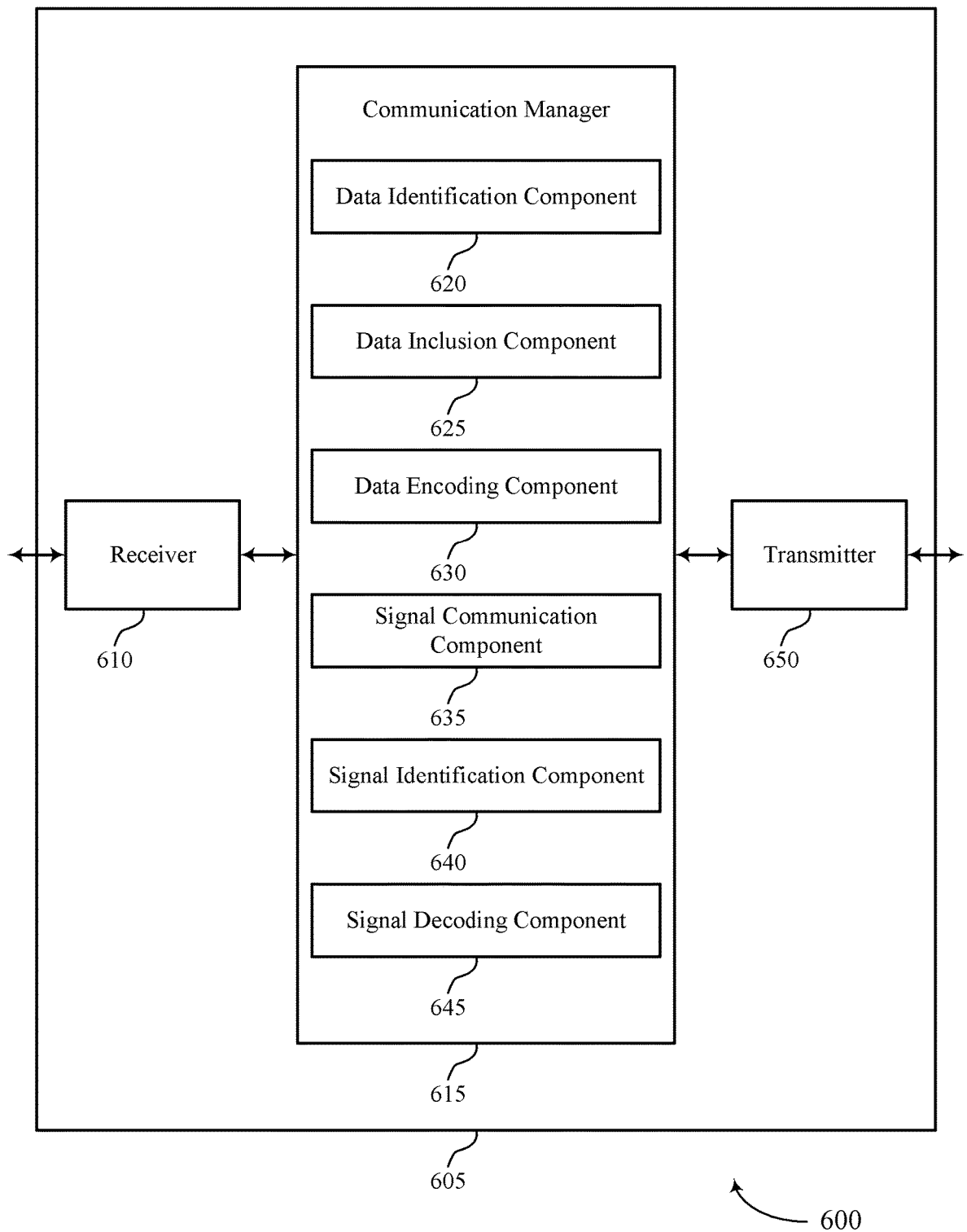

FIG. 6 shows a block diagram 600 of a device 605 that supports improved spectral efficiency for tone reservation PAPR reduction in accordance with aspects of the present disclosure. The device 605 may be an example of aspects of a device 505, a UE 115, or a base station 105 as described herein. The device 605 may include a receiver 610, a communication manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to improved spectral efficiency for tone reservation PAPR reduction, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a data identification component 620, a data inclusion component 625, a data encoding component 630, a signal communication component 635, a signal identification component 640, and a signal decoding component 645. The communication manager 615 may be an example of aspects of the communication manager 810 or 9910 as described herein.

The data identification component 620 may identify data to include in an IM-OFDM data transmission for which a set of REs is available, where the data includes a first portion and a second portion and the set of REs includes a first subset of REs and a second subset of REs.

The data inclusion component 625 may include the first portion of the data in the first subset of REs, where the first subset of REs are selected to correspond to one or more active subcarriers for the IM-OFDM data transmission.

The data encoding component 630 may encode the second portion of the data by a configuration of the first subset of REs.

The signal communication component 635 may transmit, via the IM-OFDM data transmission, first signals over the first subset of REs, the first signals representative of the first portion of the data and transmit, via the IM-OFDM data transmission and over one or more REs of the second subset of REs, one or more second signals. The signal communication component 635 may receive, via an IM-OFDM data transmission over a set of REs, first signals over a first subset of REs of the set of REs, and one or more second signals over a second subset of REs of the set of REs.

The signal identification component 640 may identify that the one or more second signals include content other than data of the IM-OFDM data transmission.

The signal decoding component 645 may decode the first signals over the first subset of REs in order to identify a first portion of the data of the IM-OFDM data transmission, decode a configuration of the first subset of REs in order to identify a second portion of the data of the IM-OFDM data transmission, and refrain from decoding the one or more second signals based on the identifying.

The transmitter 650 may transmit signals generated by other components of the device 605. In some examples, the transmitter 650 may be collocated with a receiver 610 in a transceiver module. For example, the transmitter 650 may be an example of aspects of the transceiver 815 described with reference to FIG. 8. The transmitter 650 may utilize a single antenna or a set of antennas.

Figure 7:
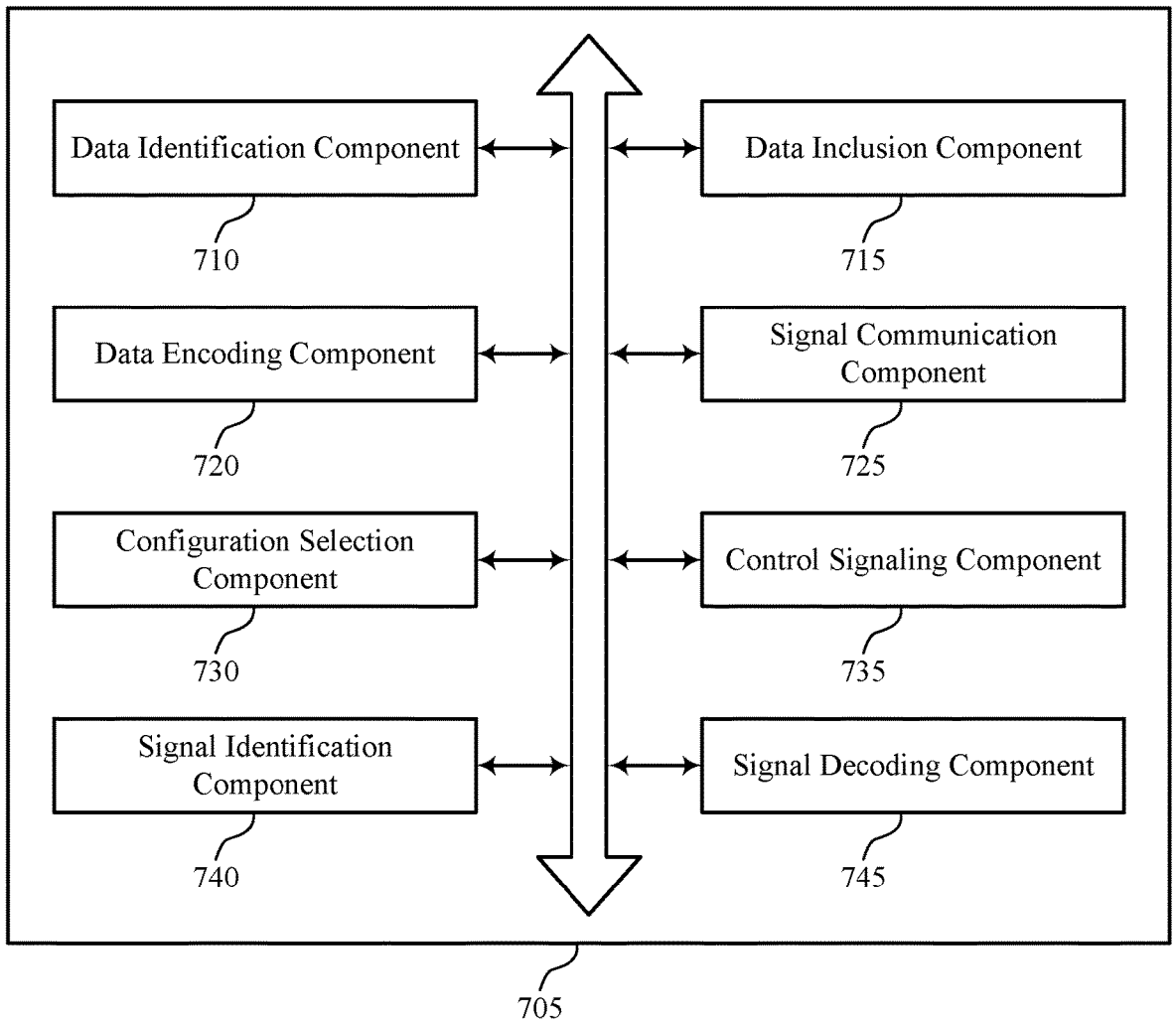
FIG. 7 shows a block diagram of a communication manager that supports improved spectral efficiency for tone reservation PAPR reduction in accordance with aspects of the present disclosure.

FIG. 7 shows a block diagram 700 of a communication manager 705 that supports improved spectral efficiency for tone reservation PAPR reduction in accordance with aspects of the present disclosure. The communication manager 705 may be an example of aspects of a communication manager 515, a communication manager 615, or a communication manager 810 described herein. The communication manager 705 may include a data identification component 710, a data inclusion component 715, a data encoding component 720, a signal communication component 725, a configuration selection component 730, a control signaling component 735, a signal identification component 740, and a signal decoding component 745. Each of these modules may communicate, directly or indirectly, with one another (e.g., via one or more buses).

The data identification component 710 may identify data to include in an IM-OFDM data transmission for which a set of REs is available, where the data includes a first portion and a second portion and the set of REs includes a first subset of REs and a second subset of REs.

The data inclusion component 715 may include the first portion of the data in the first subset of REs, where the first subset of REs are selected to correspond to one or more active subcarriers for the IM-OFDM data transmission.

The data encoding component 720 may encode the second portion of the data by a configuration of the first subset of REs.

The signal communication component 725 may transmit, via the IM-OFDM data transmission, first signals over the first subset of REs, the first signals representative of the first portion of the data. In some examples, the signal communication component 725 may transmit, via the IM-OFDM data transmission and over one or more REs of the second subset of REs, one or more second signals. In some examples, the signal communication component 725 may receive, via an IM-OFDM data transmission over a set of REs, first signals over a first subset of REs of the set of REs, and one or more second signals over a second subset of REs of the set of REs. In some examples, the signal communication component 725 may reduce a peak-to-average-power ratio associated with transmission of the first signals by transmission of the one or more second signals.

The configuration selection component 730 may select the configuration according to an index modulation scheme.

The control signaling component 735 may transmit control signaling indicating a frequency band including the set of REs. In some examples, the control signaling component 735 may receive control signaling indicating a frequency band including the set of REs, where identifying that the one or more second signals include the content other than the data of the IM-OFDM data transmission is based on receiving the control signaling.

The signal identification component 740 may identify that the one or more second signals include content other than data of the IM-OFDM data transmission.

The signal decoding component 745 may decode the first signals over the first subset of REs in order to identify a first portion of the data of the IM-OFDM data transmission. In some examples, the signal decoding component 745 may decode a configuration of the first subset of REs in order to identify a second portion of the data of the IM-OFDM data transmission. In some examples, the signal decoding component 745 may refrain from decoding the one or more second signals based on the identifying. In some examples, the signal decoding component 745 may decode the configuration according to an index modulation scheme.

In some examples, the signal decoding component 745 may determine a total number of REs of the second subset of REs based on a total number of REs of the set of REs and a total number of bits corresponding to the second portion of the data. In some examples, the signal decoding component 745 may determine a total number of bits corresponding to the second portion of the data based on a total number of REs of the second subset of REs and a total number of REs of the set of REs. In some cases, the first portion of the data includes a set of bits, and where the first signals cumulatively indicate each bit of the set of bits. In some cases, the first portion of the data includes a set of bits, and where each of the first signals indicate a same number of bits.

Figure 8:
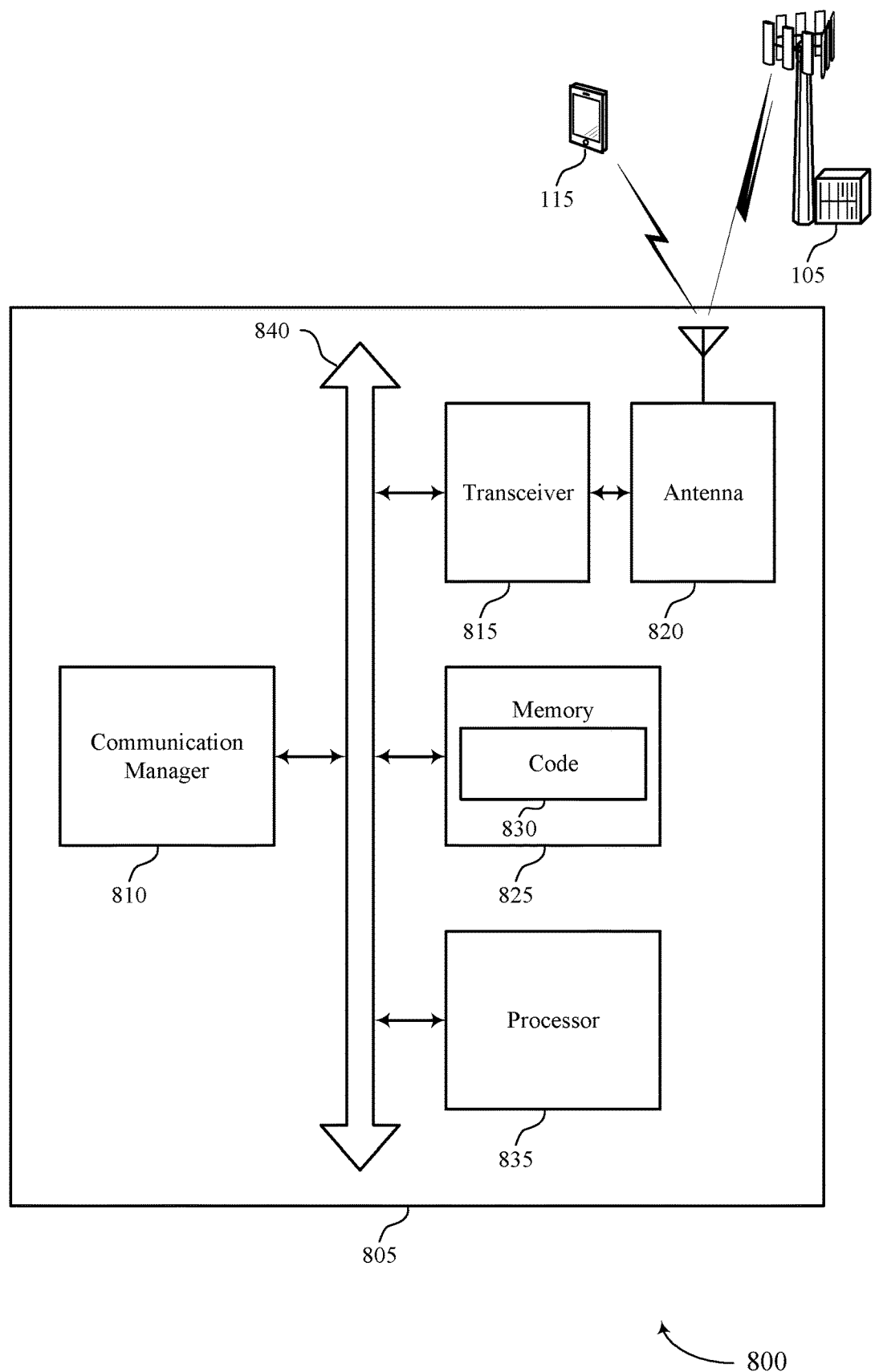
FIG. 8 shows a diagram of a system including a user equipment (UE) that supports improved spectral efficiency for tone reservation PAPR reduction in accordance with aspects of the present disclosure.

FIG. 8 shows a diagram of a system 800 including a device 805 that supports improved spectral efficiency for tone reservation PAPR reduction in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may identify data to include in an IM-OFDM data transmission for which a set of REs is available, where the data includes a first portion and a second portion and the set of REs includes a first subset of REs and a second subset of REs, include the first portion of the data in the first subset of REs, where the first subset of REs are selected to correspond to one or more active subcarriers for the IM-OFDM data transmission, encode the second portion of the data by a configuration of the first subset of REs, transmit, via the IM-OFDM data transmission, first signals over the first subset of REs, the first signals representative of the first portion of the data, and transmit, via the IM-OFDM data transmission and over one or more REs of the second subset of REs, one or more second signals. The communication manager 810 may also receive, via an IM-OFDM data transmission over a set of REs, first signals over a first subset of REs of the set of REs, and one or more second signals over a second subset of REs of the set of REs, identify that the one or more second signals include content other than data of the IM-OFDM data transmission, decode the first signals over the first subset of REs in order to identify a first portion of the data of the IM-OFDM data transmission, decode a configuration of the first subset of REs in order to identify a second portion of the data of the IM-OFDM data transmission, and refrain from decoding the one or more second signals based on the identifying.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting improved spectral efficiency for tone reservation PAPR reduction).

Figure 9:
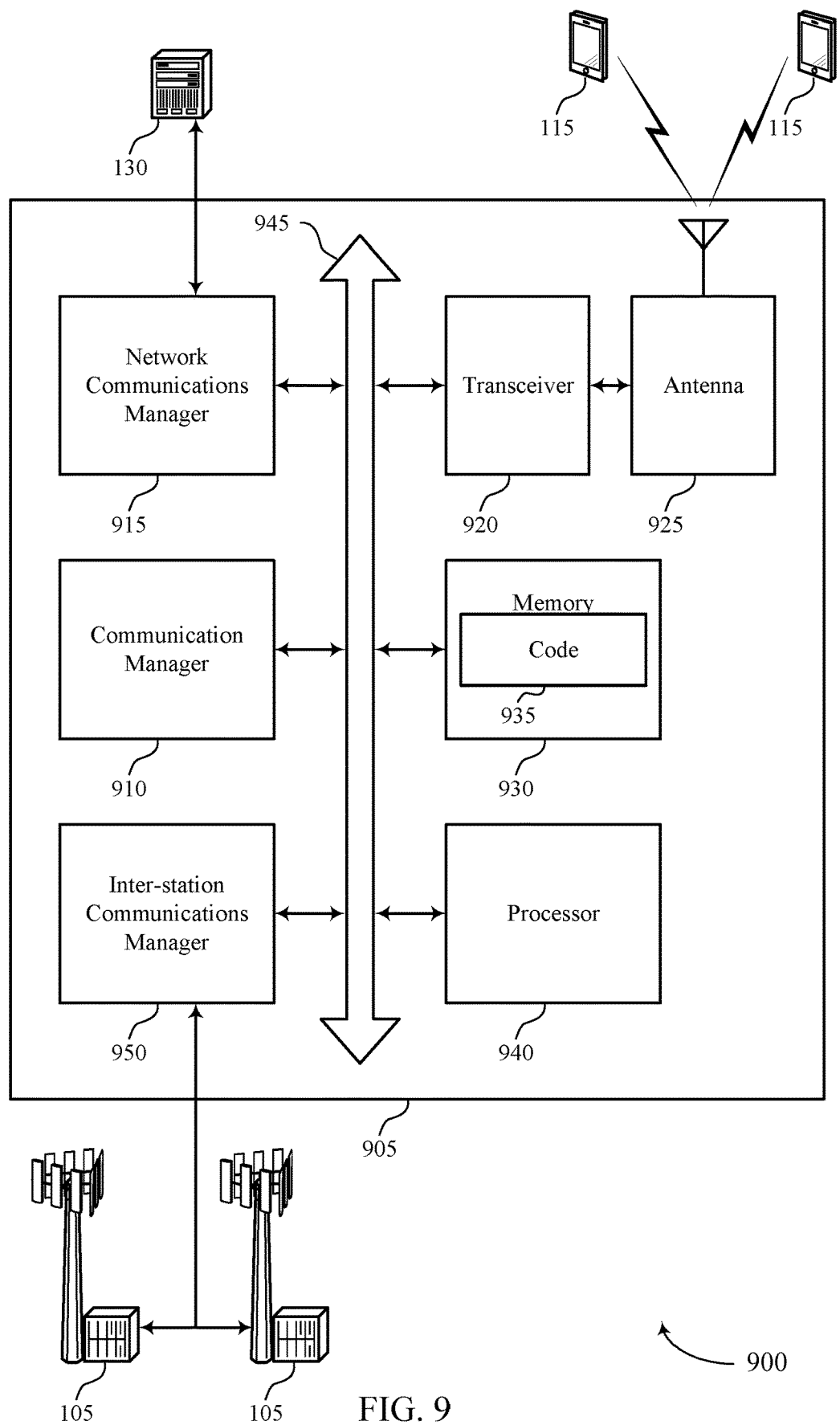
FIG. 9 shows a diagram of a system including a base station that supports improved spectral efficiency for tone reservation PAPR reduction in accordance with aspects of the present disclosure.

FIG. 9 shows a diagram of a system 900 including a device 905 that supports improved spectral efficiency for tone reservation PAPR reduction in accordance with aspects of the present disclosure. The device 905 may be an example of or include the components of device 505, device 605, or a base station 105 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may identify data to include in an IM-OFDM data transmission for which a set of REs is available, where the data includes a first portion and a second portion and the set of REs includes a first subset of REs and a second subset of REs, include the first portion of the data in the first subset of REs, where the first subset of REs are selected to correspond to one or more active subcarriers for the IM-OFDM data transmission, encode the second portion of the data by a configuration of the first subset of REs, transmit, via the IM-OFDM data transmission, first signals over the first subset of REs, the first signals representative of the first portion of the data, and transmit, via the IM-OFDM data transmission and over one or more REs of the second subset of REs, one or more second signals. The communication manager 910 may also receive, via an IM-OFDM data transmission over a set of REs, first signals over a first subset of REs of the set of REs, and one or more second signals over a second subset of REs of the set of REs, identify that the one or more second signals include content other than data of the IM-OFDM data transmission, decode the first signals over the first subset of REs in order to identify a first portion of the data of the IM-OFDM data transmission, decode a configuration of the first subset of REs in order to identify a second portion of the data of the IM-OFDM data transmission, and refrain from decoding the one or more second signals based on the identifying.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include RAM and ROM. The memory 925 may store computer-readable, computer-executable code 930 including instructions that, when executed, cause the processor to perform various functions described herein. In some cases, the memory 925 may contain, among other things, a BIOS which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting improved spectral efficiency for tone reservation PAPR reduction).

Figure 10:
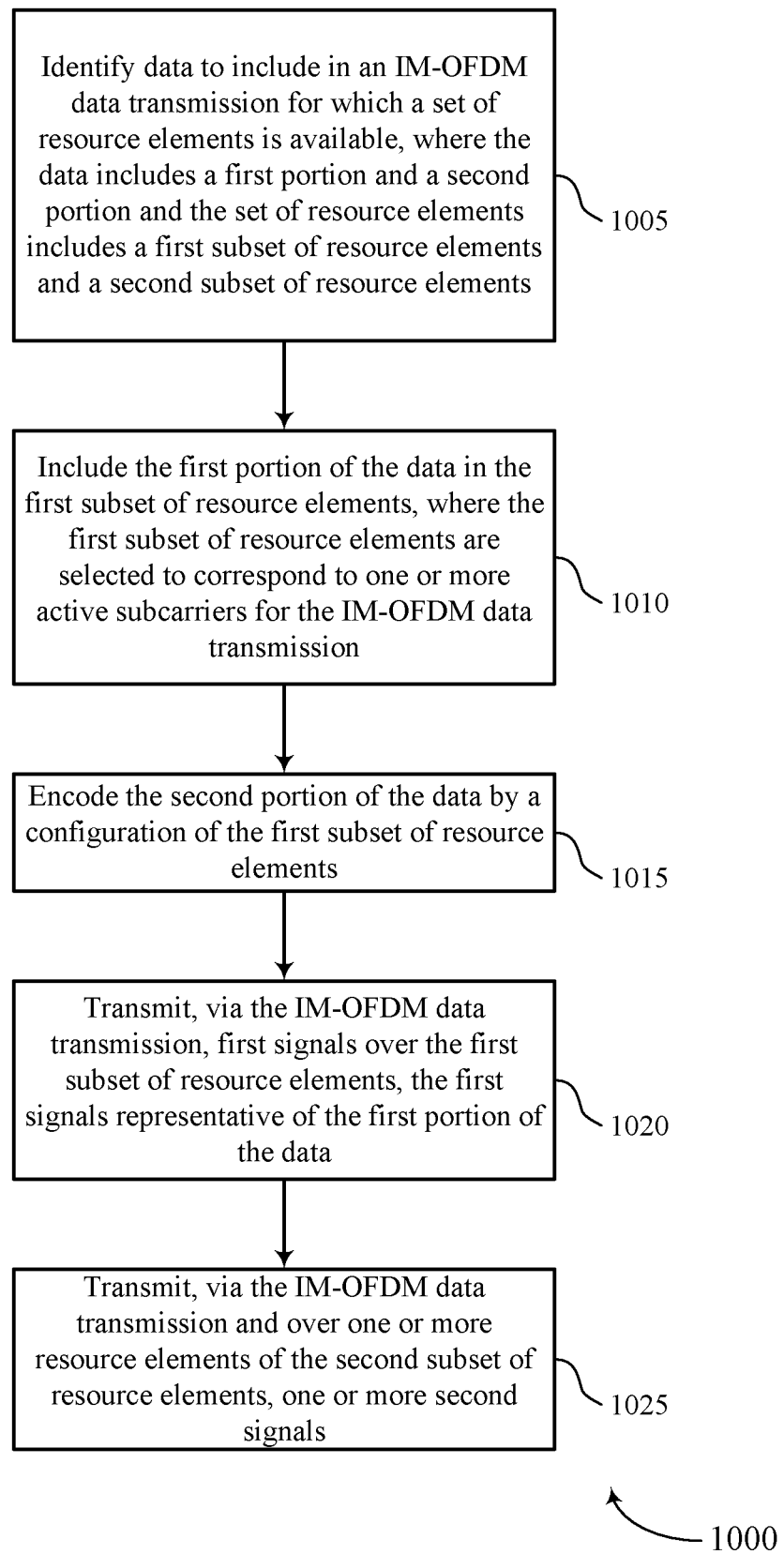
FIGS. 10 through 13 show flowcharts illustrating methods that support improved spectral efficiency for tone reservation PAPR reduction in accordance with aspects of the present disclosure.

FIG. 10 shows a flowchart illustrating a method 1000 that supports improved spectral efficiency for tone reservation PAPR reduction in accordance with aspects of the present disclosure. The operations of method 1000 may be implemented by a UE 115 or base station 105 or its components as described herein. For example, the operations of method 1000 may be performed by a communication manager as described with reference to FIGS. 5 through 9. In some examples, a UE or base station may execute a set of instructions to control the functional elements of the UE or base station to perform the described functions. Additionally or alternatively, a UE or base station may perform aspects of the described functions using special-purpose hardware.

At 1005, the UE or base station may identify data to include in an IM-OFDM data transmission for which a set of REs is available, where the data includes a first portion and a second portion and the set of REs includes a first subset of REs and a second subset of REs. The operations of 1005 may be performed according to the methods described herein. In some examples, aspects of the operations of 1005 may be performed by a data identification component as described with reference to FIGS. 5 through 9.

At 1010, the UE or base station may include the first portion of the data in the first subset of REs, where the first subset of REs are selected to correspond to one or more active subcarriers for the IM-OFDM data transmission. The operations of 1010 may be performed according to the methods described herein. In some examples, aspects of the operations of 1010 may be performed by a data inclusion component as described with reference to FIGS. 5 through 9.

At 1015, the UE or base station may encode the second portion of the data by a configuration of the first subset of REs. The operations of 1015 may be performed according to the methods described herein. In some examples, aspects of the operations of 1015 may be performed by a data encoding component as described with reference to FIGS. 5 through 9.

At 1020, the UE or base station may transmit, via the IM-OFDM data transmission, first signals over the first subset of REs, the first signals representative of the first portion of the data. The operations of 1020 may be performed according to the methods described herein. In some examples, aspects of the operations of 1020 may be performed by a signal communication component as described with reference to FIGS. 5 through 9.

At 1025, the UE or base station may transmit, via the IM-OFDM data transmission and over one or more REs of the second subset of REs, one or more second signals. The operations of 1025 may be performed according to the methods described herein. In some examples, aspects of the operations of 1025 may be performed by a signal communication component as described with reference to FIGS. 5 through 9.

Figure 11:
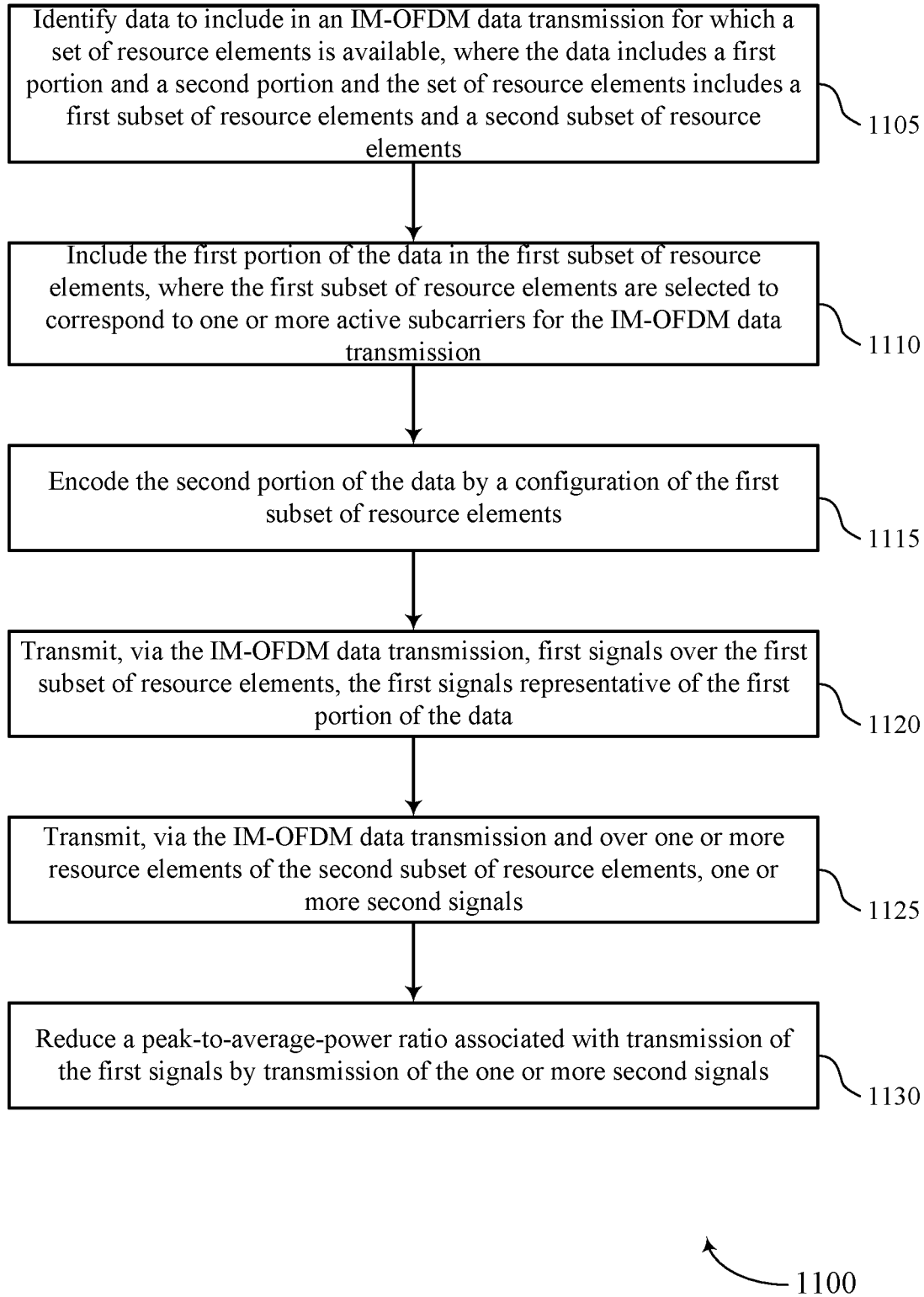

FIG. 11 shows a flowchart illustrating a method 1100 that supports improved spectral efficiency for tone reservation PAPR reduction in accordance with aspects of the present disclosure. The operations of method 1100 may be implemented by a UE 115 or base station 105 or its components as described herein. For example, the operations of method 1100 may be performed by a communication manager as described with reference to FIGS. 5 through 9. In some examples, a UE or base station may execute a set of instructions to control the functional elements of the UE or base station to perform the described functions. Additionally or alternatively, a UE or base station may perform aspects of the described functions using special-purpose hardware.

At 1105, the UE or base station may identify data to include in an IM-OFDM data transmission for which a set of REs is available, where the data includes a first portion and a second portion and the set of REs includes a first subset of REs and a second subset of REs. The operations of 1105 may be performed according to the methods described herein. In some examples, aspects of the operations of 1105 may be performed by a data identification component as described with reference to FIGS. 5 through 9.

At 1110, the UE or base station may include the first portion of the data in the first subset of REs, where the first subset of REs are selected to correspond to one or more active subcarriers for the IM-OFDM data transmission. The operations of 1110 may be performed according to the methods described herein. In some examples, aspects of the operations of 1110 may be performed by a data inclusion component as described with reference to FIGS. 5 through 9.

At 1115, the UE or base station may encode the second portion of the data by a configuration of the first subset of REs. The operations of 1115 may be performed according to the methods described herein. In some examples, aspects of the operations of 1115 may be performed by a data encoding component as described with reference to FIGS. 5 through 9.

At 1120, the UE or base station may transmit, via the IM-OFDM data transmission, first signals over the first subset of REs, the first signals representative of the first portion of the data. The operations of 1120 may be performed according to the methods described herein. In some examples, aspects of the operations of 1120 may be performed by a signal communication component as described with reference to FIGS. 5 through 9.

At 1125, the UE or base station may transmit, via the IM-OFDM data transmission and over one or more REs of the second subset of REs, one or more second signals. The operations of 1125 may be performed according to the methods described herein. In some examples, aspects of the operations of 1125 may be performed by a signal communication component as described with reference to FIGS. 5 through 9.

At 1130, the UE or base station may reduce a peak-to-average-power ratio associated with transmission of the first signals by transmission of the one or more second signals. The operations of 1130 may be performed according to the methods described herein. In some examples, aspects of the operations of 1130 may be performed by a signal communication component as described with reference to FIGS. 5 through 9.

Figure 12:
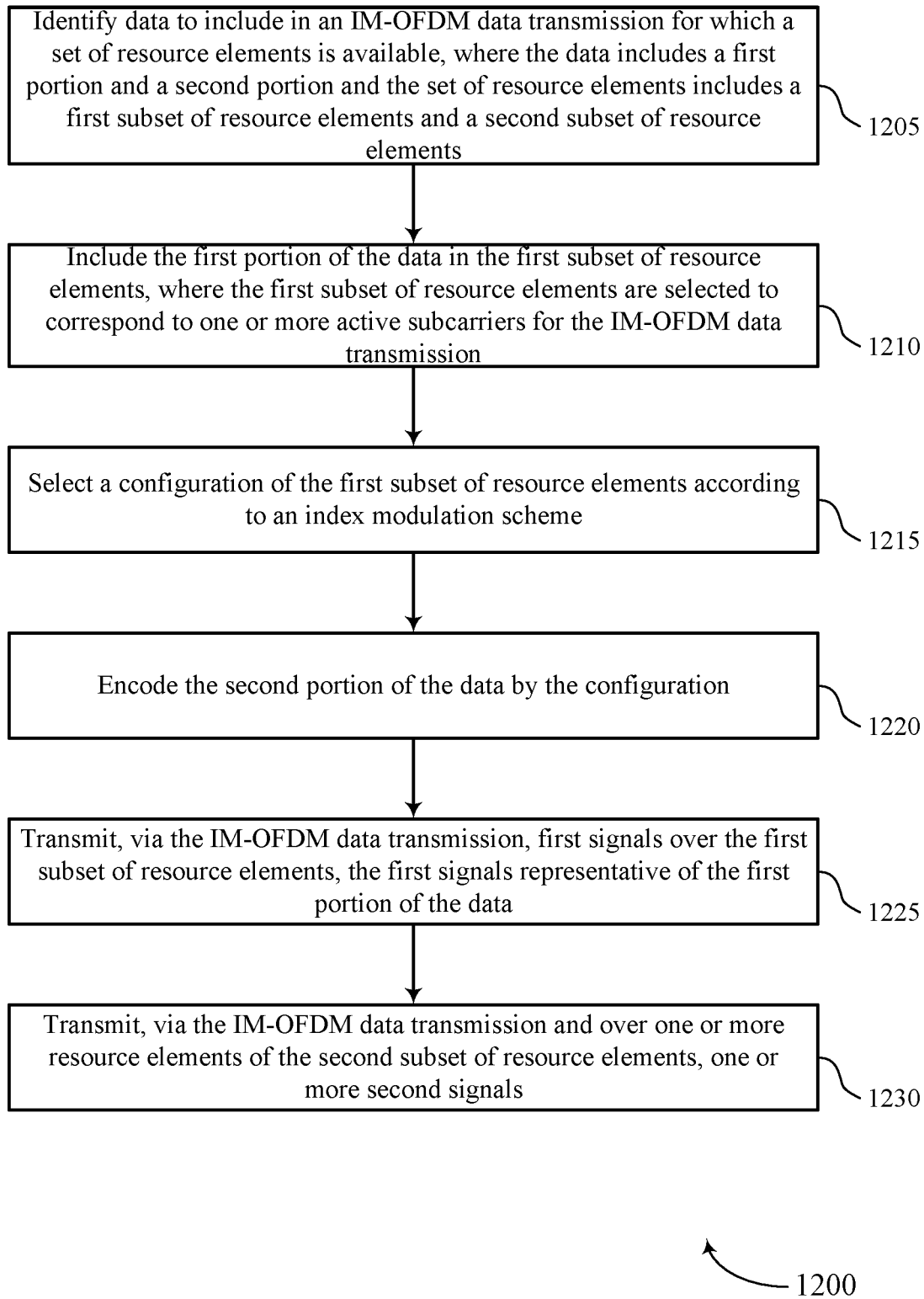

FIG. 12 shows a flowchart illustrating a method 1200 that supports improved spectral efficiency for tone reservation PAPR reduction in accordance with aspects of the present disclosure. The operations of method 1200 may be implemented by a UE 115 or base station 105 or its components as described herein. For example, the operations of method 1200 may be performed by a communication manager as described with reference to FIGS. 5 through 9. In some examples, a UE or base station may execute a set of instructions to control the functional elements of the UE or base station to perform the described functions. Additionally or alternatively, a UE or base station may perform aspects of the described functions using special-purpose hardware.

At 1205, the UE or base station may identify data to include in an IM-OFDM data transmission for which a set of REs is available, where the data includes a first portion and a second portion and the set of REs includes a first subset of REs and a second subset of REs. The operations of 1205 may be performed according to the methods described herein. In some examples, aspects of the operations of 1205 may be performed by a data identification component as described with reference to FIGS. 5 through 9.

At 1210, the UE or base station may include the first portion of the data in the first subset of REs, where the first subset of REs are selected to correspond to one or more active subcarriers for the IM-OFDM data transmission. The operations of 1210 may be performed according to the methods described herein. In some examples, aspects of the operations of 1210 may be performed by a data inclusion component as described with reference to FIGS. 5 through 9.

At 1215, the UE or base station may select the configuration of the first subset of REs according to an index modulation scheme. The operations of 1215 may be performed according to the methods described herein. In some examples, aspects of the operations of 1215 may be performed by a configuration selection component as described with reference to FIGS. 5 through 9.

At 1220, the UE or base station may encode the second portion of the data by the configuration. The operations of 1220 may be performed according to the methods described herein. In some examples, aspects of the operations of 1220 may be performed by a data encoding component as described with reference to FIGS. 5 through 9.

At 1225, the UE or base station may transmit, via the IM-OFDM data transmission, first signals over the first subset of REs, the first signals representative of the first portion of the data. The operations of 1225 may be performed according to the methods described herein. In some examples, aspects of the operations of 1225 may be performed by a signal communication component as described with reference to FIGS. 5 through 9.

At 1230, the UE or base station may transmit, via the IM-OFDM data transmission and over one or more REs of the second subset of REs, one or more second signals. The operations of 1230 may be performed according to the methods described herein. In some examples, aspects of the operations of 1230 may be performed by a signal communication component as described with reference to FIGS. 5 through 9.

Figure 13:
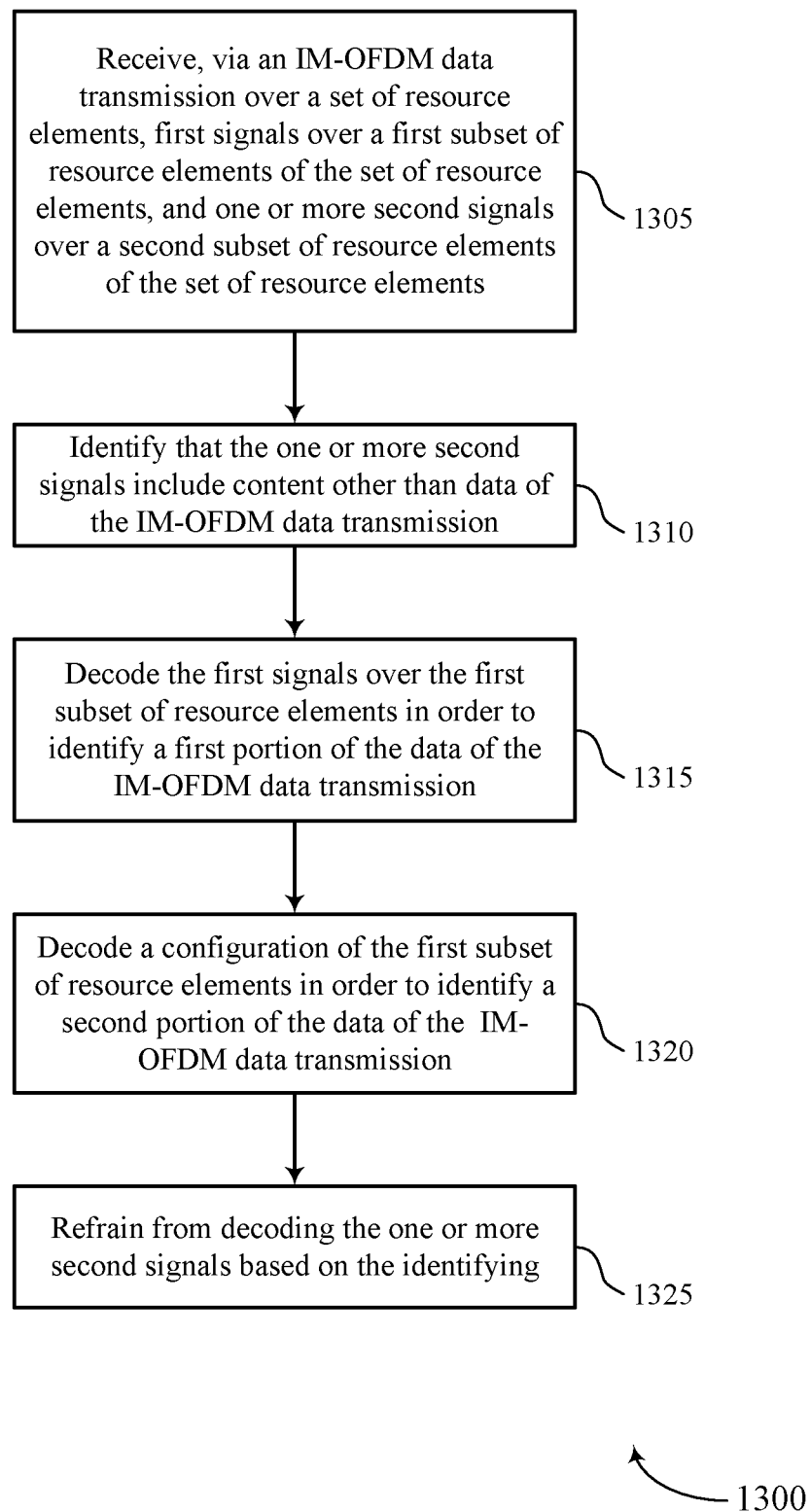

FIG. 13 shows a flowchart illustrating a method 1300 that supports improved spectral efficiency for tone reservation PAPR reduction in accordance with aspects of the present disclosure. The operations of method 1300 may be implemented by a UE 115 or base station 105 or its components as described herein. For example, the operations of method 1300 may be performed by a communication manager as described with reference to FIGS. 5 through 9. In some examples, a UE or base station may execute a set of instructions to control the functional elements of the UE or base station to perform the described functions. Additionally or alternatively, a UE or base station may perform aspects of the described functions using special-purpose hardware.

At 1305, the UE or base station may receive, via an IM-OFDM data transmission over a set of REs, first signals over a first subset of REs of the set of REs, and one or more second signals over a second subset of REs of the set of REs. The operations of 1305 may be performed according to the methods described herein. In some examples, aspects of the operations of 1305 may be performed by a signal communication component as described with reference to FIGS. 5 through 9.

At 1310, the UE or base station may identify that the one or more second signals include content other than data of the IM-OFDM data transmission. The operations of 1310 may be performed according to the methods described herein. In some examples, aspects of the operations of 1310 may be performed by a signal identification component as described with reference to FIGS. 5 through 9.

At 1315, the UE or base station may decode the first signals over the first subset of REs in order to identify a first portion of the data of the IM-OFDM data transmission. The operations of 1315 may be performed according to the methods described herein. In some examples, aspects of the operations of 1315 may be performed by a signal decoding component as described with reference to FIGS. 5 through 9.

At 1320, the UE or base station may decode a configuration of the first subset of REs in order to identify a second portion of the data of the IM-OFDM data transmission. The operations of 1320 may be performed according to the methods described herein. In some examples, aspects of the operations of 1320 may be performed by a signal decoding component as described with reference to FIGS. 5 through 9.

At 1325, the UE or base station may refrain from decoding the one or more second signals based on the identifying. The operations of 1325 may be performed according to the methods described herein. In some examples, aspects of the operations of 1325 may be performed by a signal decoding component as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communications, comprising: identifying data to include in an IM-OFDM data transmission for which a set of resource elements is available, wherein the data includes a first portion and a second portion and the set of resource elements includes a first subset of resource elements and a second subset of resource elements; including the first portion of the data in the first subset of resource elements, wherein the first subset of resource elements are selected to correspond to one or more active subcarriers for the IM-OFDM data transmission; encoding the second portion of the data by a configuration of the first subset of resource elements; transmitting, via the IM-OFDM data transmission, first signals over the first subset of resource elements, the first signals representative of the first portion of the data; and transmitting, via the IM-OFDM data transmission and over one or more resource elements of the second subset of resource elements, one or more second signals.

Example 2: The method of example 1, further comprising: reducing a peak-to-average-power ratio associated with transmission of the first signals by transmission of the one or more second signals.

Example 3: The method of any of examples 1 or 2, wherein the one or more second signals are tone reservation or dummy signals.

Example 4: The method of any of examples 1 to 3, further comprising: selecting the configuration according to an index modulation scheme.

Example 5: The method of any of examples 1 to 4, further comprising: transmitting control signaling indicating a frequency band comprising the set of resource elements.

Example 6: The method of any of examples 1 to 5, wherein a transmit power associated with each first signal transmitted over the one or more resource elements of the first subset is greater than a transmit power associated with each second signal transmitted over the one or more resource elements of the second subset.

Example 7: The method of any of examples 1 to 6, wherein the second signal over each of the second subset of resource elements is configured to reduce a peak-to-average-power ratio associated with transmission of the first signals based at least in part on reducing one or more peaks associated with the first signals.

Example 8: The method of any of examples 1 to 7, wherein the first portion of the data corresponds to a set of bits, and wherein the first signals transmitted over the one or more resource elements of the first subset cumulatively indicate each bit of the set of bits.

Example 9: The method of any of examples 1 to 8, wherein the first portion of the data corresponds to a set of bits, and wherein each first signal transmitted over the one or more resource elements of the first subset indicates a same number of bits of the set of bits.

Example 10: The method of any of examples 1 to 9, wherein a total number of resource elements of the first subset of resource elements is based at least in part on a total number of resource elements of the set of resource elements and a total number of bits corresponding to the second portion of the data.

Example 11: The method of any of examples 1 to 10, wherein a total number of bits corresponding to the second portion of the data is based at least in part on a total number of resource elements of the first subset of resource elements and a total number of resource elements of the set of resource elements.

Example 12: An apparatus comprising at least one means for performing a method of any of examples 1 to 11.

Example 13: An apparatus for wireless communications comprising a processor; memory coupled with the processor; and instructions stored in the memory and executable by the processor to cause the apparatus to perform a method of any of examples 1 to 11.

Example 14: A non-transitory computer-readable medium storing code for wireless communications, the code comprising instructions executable by a processor to perform a method of any of examples 1 to 11.

Example 15: A method for wireless communication, comprising: identifying data for an IM-OFDM transmission; identifying, from a set of allocated resources, first subcarriers for transmitting a first signal comprising the data; identifying, from the set of allocated resources, second subcarriers comprising a tone reservation for the IM-OFDM transmission on which the data is not transmitted; processing a second signal for transmission on the second subcarriers, the second signal comprising a peak-cancellation signal determined based at least in part on a waveform of the first signal; transmitting, in the IM-OFDM transmission, the first signal on the first subcarriers of the resource allocation; and transmitting, in the IM-OFDM transmission, the second signal on the second subcarriers of the resource allocation.

Example 16: An apparatus comprising at least one means for performing the method of example 15.

Example 17: An apparatus for wireless communications comprising a processor; memory coupled with the processor; and instructions stored in the memory and executable by the processor to cause the apparatus to perform the method of example 15.

Example 18: A non-transitory computer-readable medium storing code for wireless communications, the code comprising instructions executable by a processor to perform the method example 15.

Example 19: A method for wireless communication, comprising: receiving, via an IM-OFDM data transmission over a set of resource elements, first signals over a first subset of resource elements of the set of resource elements, and one or more second signals over a second subset of resource elements of the set of resource elements; identifying that the one or more second signals include content other than data of the IM-OFDM data transmission; decoding the first signals over the first subset of resource elements in order to identify a first portion of the data of the IM-OFDM data transmission; decoding a configuration of the first subset of resource elements in order to identify a second portion of the data of the IM-OFDM data transmission; and refraining from decoding the one or more second signals based at least in part on the identifying.

Example 20: The method of example 19, wherein the one or more second signals are tone reservation or dummy signals.

Example 21: The method of any of examples 19 or 20, further comprising: decoding the configuration according to an index modulation scheme.

Example 22: The method of any of examples 19 to 21, further comprising: receiving control signaling indicating a frequency band comprising the set of resource elements, wherein identifying that the one or more second signals include the content other than the data of the IM-OFDM data transmission is based at least in part on receiving the control signaling.

Example 23: The method of any of examples 19 to 22, wherein identifying that the one or more second signals include the content other than the data of the IM-OFDM data transmission is based at least in part on a receive power associated with the first signals being greater than a receive power associated with the one or more second signals.

Example 24: The method of any of examples 19 to 23, wherein the first portion of the data comprises a set of bits, and wherein the first signals cumulatively indicate each bit of the set of bits.

Example 25: The method of any of examples 19 to 24, wherein the first portion of the data comprises a set of bits, and wherein each of the first signals indicate a same number of bits.

Example 26: The method of any of examples 19 to 25, further comprising: determining a total number of resource elements of the second subset of resource elements based at least in part on a total number of resource elements of the set of resource elements and a total number of bits corresponding to the second portion of the data.

Example 27: The method of any of examples 19 to 26, further comprising: determining a total number of bits corresponding to the second portion of the data based at least in part on a total number of resource elements of the second subset of resource elements and a total number of resource elements of the set of resource elements.

Example 28: An apparatus comprising at least one means for performing a method of any of examples 19 to 27.

Example 29: An apparatus for wireless communications comprising a processor; memory coupled with the processor; and instructions stored in the memory and executable by the processor to cause the apparatus to perform a method of any of examples 19 to 27.

Example 30: A non-transitory computer-readable medium storing code for wireless communications, the code comprising instructions executable by a processor to perform a method of any of examples 19 to 27.

Example 31: A method for wireless communication, comprising: receiving an IM-OFDM transmission, wherein the IM-OFDM transmission comprises a first signal comprising data on first subcarriers of a set of allocated resources and a second signal comprising a peak-cancellation signal on second subcarriers of the set of allocated resources; identifying that the second subcarriers comprise a tone reservation for the IM-OFDM transmission on which data is not transmitted; determining a waveform of the first signal based at least in part on the identifying; decoding the first signal in order to identify the data based at least in part on the determining; and refraining from decoding the second signal based at least in part on the identifying.

Example 32: An apparatus comprising at least one means for performing the method of example 31.

Example 33: An apparatus for wireless communications comprising a processor; memory coupled with the processor; and instructions stored in the memory and executable by the processor to cause the apparatus to perform the method of example 31.

Example 34: A non-transitory computer-readable medium storing code for wireless communications, the code comprising instructions executable by a processor to perform the method of example 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying data to include in an index modulation orthogonal frequency division multiplexing (IM-OFDM) data transmission for which a set of resource elements is available, wherein the data includes a first portion and a second portion and the set of resource elements includes a first subset of resource elements and a second subset of resource elements,
   wherein the first subset of resource elements is selected to correspond to one or more active subcarriers for the IM-OFDM data transmission;
   encoding the second portion of the data by a configuration associated with the first subset of resource elements;
   transmitting, via the IM-OFDM data transmission, first signals over the first subset of resource elements, the first signals comprising the first portion of the data; and
   transmitting, via the IM-OFDM data transmission and over one or more resource elements of the second subset of resource elements, one or more second signals, wherein a transmit power associated with each of the first signals transmitted over the first subset of resource elements is greater than a transmit power associated with each of the one or more second signals transmitted over the one or more resource elements of the second subset of resource elements.

2. The method of claim 1, further comprising:
   reducing a peak-to-average-power ratio associated with transmission of the first signals by transmission of the one or more second signals.

3. The method of claim 1, wherein the one or more second signals are tone reservation or dummy signals.

4. The method of claim 1, further comprising:
   selecting the configuration associated with the first subset of resource elements according to an index modulation scheme.

5. The method of claim 1, further comprising:
   transmitting control signaling indicating a frequency band comprising the set of resource elements.

6. The method of claim 1, wherein the one or more second signals transmitted over the one or more resource elements of the second subset of resource elements are configured to reduce a peak-to-average-power ratio associated with transmission of the first signals based at least in part on reducing one or more peaks associated with the first signals.

7. The method of claim 1, wherein the first portion of the data corresponds to a set of bits, and wherein the first signals transmitted over the one or more resource elements of the first subset cumulatively indicate each bit of the set of bits.

8. The method of claim 1, wherein the first portion of the data corresponds to a set of bits, and wherein each first signal transmitted over the one or more resource elements of the first subset comprises a same number of bits of the set of bits.

9. The method of claim 1, wherein a total number of resource elements of the first subset of resource elements is based at least in part on a total number of resource elements of the set of resource elements and a total number of bits corresponding to the second portion of the data.

10. The method of claim 1, wherein a total number of bits corresponding to the second portion of the data is based at least in part on a total number of resource elements of the first subset of resource elements and a total number of resource elements of the set of resource elements.

11. A method for wireless communication, comprising:
    receiving, via an index modulation orthogonal frequency division multiplexing (IM-OFDM) data transmission over a set of resource elements, first signals over a first subset of resource elements of the set of resource elements, and one or more second signals over a second subset of resource elements of the set of resource elements;
    identifying that the one or more second signals include content other than data of the IM-OFDM data transmission;
    decoding the first signals in order to identify a first portion of the data of the IM-OFDM data transmission;
    decoding a second portion of the data of the IM-OFDM data transmission based on a configuration associated with the first subset of resource elements; and
    refraining from decoding the one or more second signals based at least in part on the identifying.

12. The method of claim 11, wherein the one or more second signals are tone reservation or dummy signals.

13. The method of claim 11, further comprising:
    decoding the configuration according to an index modulation scheme.

14. The method of claim 11, further comprising:
    receiving control signaling indicating a frequency band comprising the set of resource elements, wherein identifying that the one or more second signals include the content other than the data of the IM-OFDM data transmission is based at least in part on the control signaling.

15. The method of claim 11, wherein identifying that the one or more second signals include the content other than the data of the IM-OFDM data transmission is based at least in part on a receive power associated with the first signals being greater than a receive power associated with the one or more second signals.

16. The method of claim 11, wherein the first portion of the data comprises a set of bits, and wherein the first signals cumulatively indicate each bit of the set of bits.

17. The method of claim 11, wherein the first portion of the data comprises a set of bits, and wherein each of the first signals comprise a same number of bits.

18. The method of claim 11, further comprising:
    determining a total number of resource elements of the second subset of resource elements based at least in part on a total number of resource elements of the set of resource elements and a total number of bits corresponding to the second portion of the data.

19. The method of claim 11, further comprising:
    determining a total number of bits corresponding to the second portion of the data based at least in part on a total number of resource elements of the second subset of resource elements and a total number of resource elements of the set of resource elements.

20. An apparatus for wireless communication, comprising:
    a processor,
    memory coupled with the processor, and
    instructions stored in the memory and executable by the processor to cause the apparatus to:
       identify data to include in an index modulation orthogonal frequency division multiplexing (IM-OFDM) data transmission for which a set of resource elements is available, wherein the data includes a first portion and a second portion and the set of resource elements includes a first subset of resource elements and a second subset of resource elements,
       wherein the first subset of resource elements is selected to correspond to one or more active subcarriers for the IM-OFDM data transmission;

encode the second portion of the data by a configuration associated with the first subset of resource elements;

transmit, via the IM-OFDM data transmission, first signals over the first subset of resource elements, the first signals comprising the first portion of the data; and transmit, via the IM-OFDM data transmission and over one or more resource elements of the second subset of resource elements, one or more second signals, wherein a transmit power associated with each of the first signals transmitted over the first subset of resource elements is greater than a transmit power associated with each of the one or more second signals transmitted over the one or more resource elements of the second subset of resource elements.

21. The apparatus of claim 20, wherein the instructions are further executable by the processor to cause the apparatus to:

reduce a peak-to-average-power ratio associated with transmission of the first signals by transmission of the one or more second signals.

22. The apparatus of claim 20, wherein the one or more second signals are tone reservation or dummy signals.

23. The apparatus of claim 20, wherein the instructions are further executable by the processor to cause the apparatus to:

select the configuration associated with the first subset of resource elements according to an index modulation scheme.

24. The apparatus of claim 20, wherein the instructions are further executable by the processor to cause the apparatus to:

transmit control signaling indicating a frequency band comprising the set of resource elements.

25. An apparatus for wireless communication, comprising:

a processor, memory coupled with the processor, and instructions stored in the memory and executable by the processor to cause the apparatus to:

receive, via an index modulation orthogonal frequency division multiplexing (IM-OFDM) data transmission over a set of resource elements, first signals over a first subset of resource elements of the set of resource elements, and one or more second signals over a second subset of resource elements of the set of resource elements;

identify that the one or more second signals include content other than data of the IM-OFDM data transmission;

decode the first signals in order to identify a first portion of the data of the IM-OFDM data transmission;

decode a second portion of the data of the IM-OFDM data transmission based on a configuration associated with the first subset of resource elements; and refrain from decoding the one or more second signals based at least in part on the identifying.

26. The apparatus of claim 25, wherein the one or more second signals are tone reservation or dummy signals.

27. The apparatus of claim 25, wherein the instructions are further executable by the processor to cause the apparatus to:

decode the configuration according to an index modulation scheme.

28. The apparatus of claim 25, wherein the instructions are further executable by the processor to cause the apparatus to:

receive control signaling indicating a frequency band comprising the set of resource elements, wherein identifying that the one or more second signals include the content other than the data of the IM-OFDM data transmission is based at least in part on the control signaling.

* * * * *